(12) United States Patent
Torres et al.

(10) Patent No.: US 7,471,645 B2
(45) Date of Patent: Dec. 30, 2008

(54) METHOD AND SYSTEM FOR MULTICAST IN A BROADBAND SATELLITE SYSTEM

(75) Inventors: Robert Torres, New Market, MD (US);
Thomas Fletcher, San Diego, CA (US);
Robert Aryee, New Market, MD (US);
Mangala Kannan, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 715 days.

(21) Appl. No.: 10/684,914

(22) Filed: Oct. 14, 2003
(Under 37 CFR 1.47)

(65) Prior Publication Data
US 2004/0132448 A1    Jul. 8, 2004

Related U.S. Application Data

(60) Provisional application No. 60/421,506, filed on Oct. 25, 2002.

(51) Int. Cl.
*H04L 12/28* (2006.01)
*H04J 3/26* (2006.01)

(52) U.S. Cl. .................. 370/256; 370/390; 370/432; 370/465

(58) Field of Classification Search ................ 370/256, 370/390, 432
See application file for complete search history.

(56) References Cited

U.S. PATENT DOCUMENTS

| | | | |
|---|---|---|---|
| 6,188,691 B1 * | 2/2001 | Barkai et al. | 370/390 |
| 6,226,521 B1 * | 5/2001 | Liu et al. | 455/453 |
| 6,301,476 B1 * | 10/2001 | Monte et al. | 455/427 |
| 6,385,647 B1 | 5/2002 | Willis et al. | |
| 6,453,438 B1 * | 9/2002 | Miller et al. | 714/749 |

(Continued)

FOREIGN PATENT DOCUMENTS

CA    2 283 417    3/2001

(Continued)

OTHER PUBLICATIONS

XP-002302868, Architecture-Aware Low-Density Parity-Check Codes, Mohammad M. Mansour and Naresh Shanbhag, Coordinated Science Laboratory, ECE Department university of Illinois at Urbana-Champaign, Urbana, IL pp. 57-60.

(Continued)

*Primary Examiner*—Andrew Lee
(74) *Attorney, Agent, or Firm*—Bell, Boyd & Lloyd LLP

(57) ABSTRACT

An approach is provided for adapting multicast services originating from a terrestrial network over a satellite network. A request for establishing a multicast session corresponding to a network address of the terrestrial network is received at a hub station. The request specifies participating satellite terminals in the multicast session. The hub station assigns an address unique within the satellite network to map to the network address for the multicast session. The participating satellite terminals are configured with the assigned satellite address. A distribution mechanism is selected to transport dataflow of the multicast session to the participating satellite terminals. The distribution mechanism utilizes one or more spot beams covering the participating satellite terminals, wherein the selected distribution mechanism is switched to another one of the distribution mechanisms based on capacity of the satellite network and reachability of the participating satellite terminals.

21 Claims, 10 Drawing Sheets

U.S. PATENT DOCUMENTS

| | | | |
|---|---|---|---|
| 6,836,658 B1 * | 12/2004 | Sharon et al. | 455/429 |
| 6,894,990 B1 * | 5/2005 | Agarwal et al. | 370/321 |
| 6,917,983 B1 * | 7/2005 | Li | 709/238 |
| 2002/0061021 A1 | 5/2002 | Dillon | |
| 2002/0118638 A1 | 8/2002 | Donahue et al. | |
| 2002/0120769 A1 * | 8/2002 | Ammitzboell | 709/238 |
| 2003/0023896 A1 * | 1/2003 | Kashyap | 714/5 |
| 2003/0079022 A1 * | 4/2003 | Toporek et al. | 709/227 |
| 2003/0083087 A1 * | 5/2003 | Ekl et al. | 455/518 |
| 2003/0156540 A1 * | 8/2003 | Trossen et al. | 370/232 |

OTHER PUBLICATIONS

XP-002260921, A Massively Scaleable Decoder Architecture for Low-Density Parity-Check Coes, Anand Selvarathinam, Gwan Choi, Krishna Narayanan, Abhiram Prabhakar, Encheol Kim, Department of Electrical Engineering, Texas A&M University, College Station, TX 77843-3259, pp. 61-64.

LDPC Code Construction With Flexible Hardware Implementation, Dale E. Hocevar, DSP Solutions R & D Center, Texas Instruments, Dallas, TX, pp. 2708-2712.

XP-002312174, Draft ETSI EN 302 307 V1.1.1. (Jun. 2004), European Standard (Telecommunications series), Digital Video Broadcasting (DVB); Second generation framing structure, channel coding and modulation systems for Broadcasting, Interactive Services, News Gathering and other broadband satellite applications, pp. 1-74.

Low-Density Parity-Check Codes for Digital Subscriber Lines, E. Eleftheriou and S. Ölcer, IBM Research, Zurich Research Laboratory, 8803 Rüschlikon, Switzerland, pp. 1752-1757.

XP-001177711, Capacity Approaching Codes, Iterative Decoding Algorithms, And Their Applications, The Renaissance of Gallager's Low-Density Parity-Check Codes, Tom Richardson, Flarion Technologies, Rüdiger Urbanke, EPFL, IEEE Communications Magazine Aug. 2003, pp. 126-131.

XP-014003845, ETSI EN 301 790 V1.3.1. (Mar. 2003), European Standard (Telecommunications Series), Digital Video Broadcasting (DVB); Interaction Channel for Satellite Distribution Systems, pp. 1-110.

XP-002271230, Coded Modulation with Low Density Parity Check Codes, A Thesis by Ravi Narayanaswami, Submitted to the Office of Graduate Studies of Texas A&M University in partial fulfillment of the requirements for the degree of Master of Sciecne, Jun. 2001, pp. 1-78.

Lowering the Error-Rate Floors of Moderate-Length High-Rate Irregular LDPC Codes, Michael Yang and William E. Ryan, Department of Electrical and Computer Engineering, The University of Arizona, Tucson, AZ 85721, p. 237.

Design of Efficiently Encodable Moderate-Length High-Rate Irregular LDPC Codes, Michael Yang, Yan Li and William E. Ryan, Department of Electrical and Computer Engineering, The University of Arizona, Box 210104, Tucson, AZ 85721, Sep. 27, 2002, pp. 1415-1424.

Joint Cope and Decoder Design for Implementation-Oriented (3,k)-regular LDPC Codes, Tong Zhang and Keshab K. Parhi, Department of Electrical and Computer Engineering University of Minnesota, Minneapolis, MN 55455, USA pp. 1232-1236.

XP-002965294, Efficient Encoding of Low-Density Parity-Check Codes, Thomas J. Richardson and Rüdiger Urbanke, pp. 638, 656.

XP-000992693, Low Density Parity-Check Codes, R.G. Gallager, pp. 21-28.

\* cited by examiner

METHOD AND SYSTEM FOR MULTICAST IN A BROADBAND SATELLITE SYSTEM

RELATED APPLICATIONS

This application is related to, and claims the benefit of the earlier filing date under 35 U.S.C. § 119(e) of, U.S. Provisional Patent Application (Ser. No. 60/421,506) filed Oct. 25, 2002, entitled "Method and System for Multicast in a Broadband Satellite System with a Processing Satellite"; the entirety of which is incorporated herein by reference.

FIELD OF THE INVENTION

The present invention relates generally to a radio communications system, and is more particularly related to multicasting using a processing satellite.

BACKGROUND OF THE INVENTION

Modern satellite communication systems provide a pervasive and reliable infrastructure to distribute voice, data, and video signals for global exchange and broadcast of information. These satellite communication systems have emerged as a viable option to terrestrial communication systems, particularly in the arena of Internet access. As the popularity of the Internet continues to grow in unparalleled fashion, the communication industry has focused on improving network performance.

Sophisticated Internet applications require delivery of bandwidth intensive content (e.g., streaming audio and video), at times, to multiple receivers (i.e., hosts). Traditionally, the source host transmits the streaming media as multiple copies over separation network connections to the receivers, resulting in a large, wasteful consumption of network bandwidth. As a result, multicast services have been developed to minimize the use of network resources by disseminating only a single copy of data from the source and relying on intermediary network elements (routers) to make the appropriate number of copies. However, deployment of multicast services over a satellite system poses a number of challenges with respect to topology constraints, multicast protocol adaptation, bandwidth constraints, and network latency.

Based on the foregoing, there is a clear need for improved approaches for providing multicast services over a bandwidth constrained system. There is also a need for a mechanism that provides efficient use of scarce network capacity.

SUMMARY OF THE INVENTION

The present invention addresses the above stated needs by providing an approach for adapting terrestrial multicast services over a satellite network that includes a processing satellite capable of replicating packets. A hub station or a centralized management system (e.g., Network Operations Control Center (NOCC)) transmits messages to participating satellite terminals to configure them to support the multicast session. In response to a request for establishment of a multicast session, the NOCC maps, for example, an Internet Protocol (IP) multicast address to a satellite address (e.g., Replication Group Number (RGN)) that is unique within the satellite network. Further, the NOCC, according to an embodiment of the present invention, dynamically determines an appropriate multicast distribution mechanism to deliver the dataflow to the participating satellite terminals (and ultimately the attached hosts in the multicast group). The real-time mapping of an IP multicast can be performed at a source terminal. The distribution mechanisms utilize individually or in combination one or more spot beams and a shaped beam, which covers a configured destination area to broadcast to that area (e.g., Continental United States (CONUS)) based on, in an exemplary embodiment, capacity of the satellite network and reachability of the participating satellite terminals. The above approach advantageously provides a capability to support multicast services transparently over a satellite network. Another advantage is that satellite network resources are efficiently utilized in support of the multicast services, in that multiple distribution mechanisms are available to ensure sufficient coverage of the participating satellite terminals while minimizing redundant or unnecessary satellite transmissions.

According to one aspect of an embodiment of the present invention, a method for adapting multicast services over a satellite network is disclosed. The method includes receiving a request for establishing a multicast session associated with a network address conforming to a first communication protocol. The method also includes assigning an address conforming to a second communication protocol for a multicast group of satellite terminals within the satellite network to map to the network address. Further, the method includes transmitting configuration information including the assigned satellite address to the satellite terminals for establishment of the multicast session.

According to another aspect of an embodiment of the present invention, a method for adapting multicast services originated by a terrestrial network over a satellite network is disclosed. The method includes detecting a dataflow supporting a multicast from a source host within the terrestrial network. Also, the method includes transmitting a request for establishing a multicast session over the satellite network to a hub station. The request specifies a multicast network address supported by the terrestrial network. The hub station selectively assigns a satellite address that maps to the multicast network address and configures a satellite within the satellite network with a multicast distribution plan of participating satellite terminals. The method further includes receiving an acknowledgement message from the hub station specifying the satellite address, wherein the dataflow is forwarded by the source host over the satellite network to the participating satellite terminals according to the satellite address.

According to another aspect of an embodiment of the present invention, a method for providing a multicast session over a satellite network is disclosed. The method includes identifying participating satellite terminals in the multicast session, and determining whether one or more spot beams can cover the participating satellite terminals. The method also includes selecting one of a plurality of distribution schemes based on the determining step. Further, the method includes selectively switching to another distribution scheme that utilizes a broadcast beam according to predetermined criteria.

According to another aspect of an embodiment of the present invention, a system for adapting multicast services over a satellite network is disclosed. The system includes means for receiving a request for establishing a multicast session associated with a network address conforming to a first communication protocol, means for assigning an address conforming to a second communication protocol for a multicast group of satellite terminals within the satellite network to map to the network address, and means for transmitting configuration information including the assigned satellite address to the satellite terminals for establishment of the multicast session.

According to another aspect of an embodiment of the present invention, a system for providing a multicast session over a satellite network is disclosed. The system includes means for identifying participating satellite terminals in the multicast session; means for determining whether one or more spot beams can cover the participating satellite terminals; means for selecting one of a plurality of distribution schemes based on the determination; and means for selectively switching to another distribution scheme that utilizes a broadcast beam according to a plurality of criteria.

According to yet another aspect of an embodiment of the present invention, a method for adapting multicast services originating from a terrestrial network over a satellite network is disclosed. The method includes receiving a request for establishing a multicast session corresponding to a network address of the terrestrial network. The request specifies participating satellite terminals in the multicast session. The method also includes assigning an address unique within the satellite network to map to the network address for the multicast session, and configuring the participating satellite terminals with the assigned satellite address. Further, the method includes selecting one of a plurality of distribution mechanisms to transport dataflow of the multicast session to the participating satellite terminals. The distribution mechanisms utilize one or more spot beams covering the participating satellite terminals, wherein the selected distribution mechanism is switched to another one of the distribution mechanisms based on capacity of the satellite network and reachability of the participating satellite terminals.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for adapting multicast services over a satellite network are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is described with respect to a satellite communication system that supports data networking, it is recognized by one of ordinary skill in the art that the present invention has applicability to other radio networks (e.g., cellular, packet radio, etc.).

Figure 1:
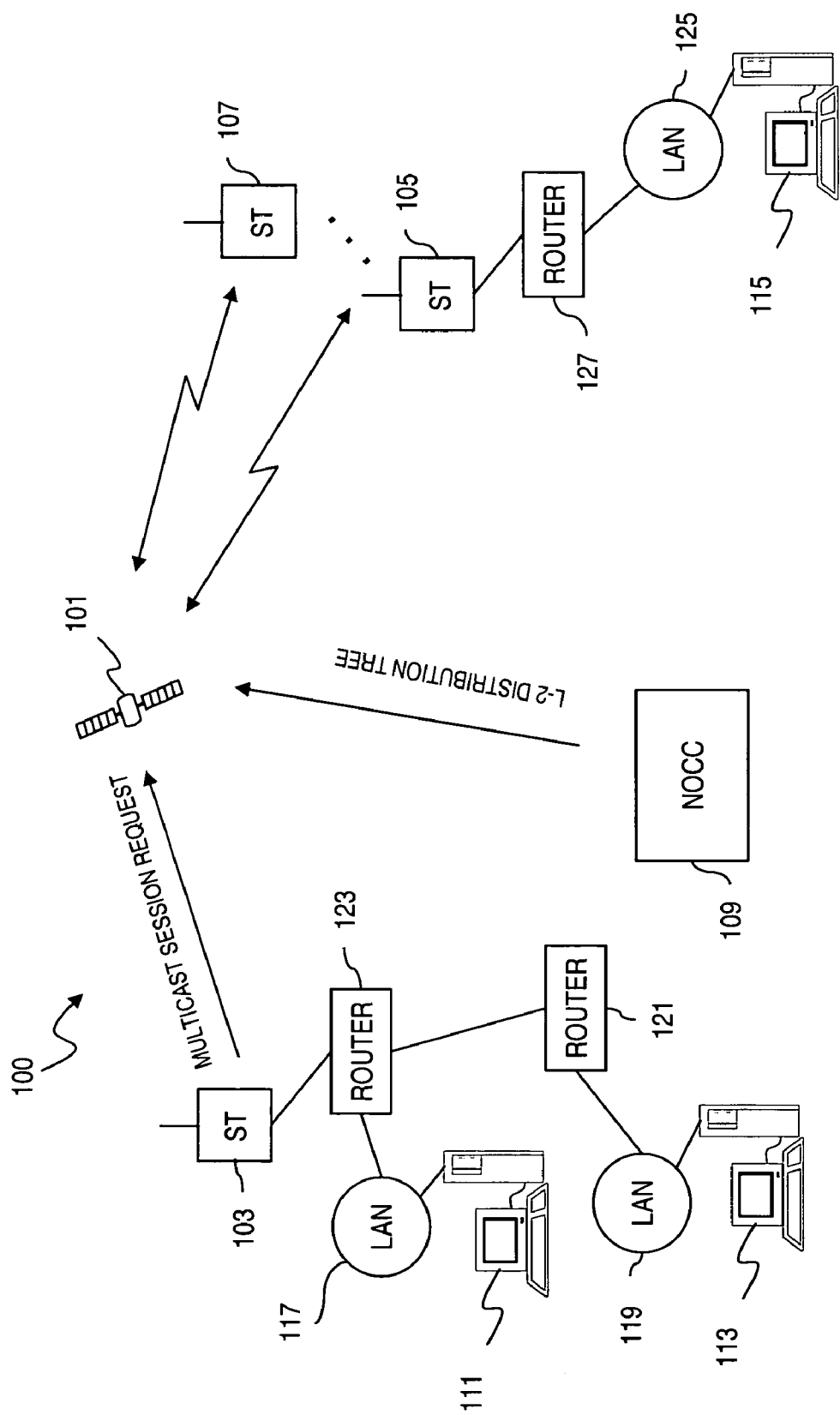
FIG. 1 is a diagram of a satellite communication system capable of providing multicasting, in accordance with an embodiment of the present invention.

FIG. 1 is a diagram of a satellite communication system capable of providing multicasting, in accordance with an embodiment of the present invention. A satellite communication system 100 utilizes a processing satellite 101 to transmit information to satellite terminals (STs) 103, 105, 107, and a Network Operations Control Center (NOCC) 109, which serves as a centralized management system for the resources of the system 100. In an exemplary embodiment, the STs 103, 105, 107 are Very Small Aperture Terminals (VSAT) that provide hosts 111, 113, 115 with access to the satellite system 200. Each of the STs 103, 105, 107 is capable of supporting multicast sessions, as either a source or a receiver (as further detailed with respect to FIGS. 2-5). The system 100 advantageously employs a multicast distribution process to ensure efficient use of network resources during a multicast; this process is more fully described in FIGS. 6-9.

The satellite 101, as a processing satellite capable of examining dataflows from the STs 103, 105, 107, performs bandwidth control functions, in conjunction with the NOCC 109, for properly allocating bandwidth to each of the STs 103, 105, 107. In addition, the satellite 101 has the capability to replicate packets in support of multicasting. Accordingly, the processing satellite 101 contains a fast packet switch (FPS) (not shown) to process data packets that are exchanged across the system 100. It is recognized by one of ordinary skill in the art that any type of switch having packet forwarding capabilities can be utilized—e.g., a Gigabit Ethernet switch. The FPS transfers the packets that the payload of the satellite 101 receives on the uplinks to the proper downlinks. The payloads of satellite 101 may include other components, such as uplink antenna, down-converters, switch matrix, demodulator banks, and phased-array downlink antenna; these other components are well known, and thus, are not described in detail.

The satellite 101 employs spot beams as well as broadcast type beams of greater coverage (e.g., Continental United States (CONUS) beam) and possesses processing functions that permit greater power and spectral efficiency than traditional bent-pipe satellites. The satellite 101 demodulates fixed-length packets that are received from STs on uplink spot beams, queues the packets for the proper downlink destination based on packet header information, and then modulates the packets for transmission on the specified downlink spot beam. Further, satellite 101 can replicate individual packets that are received on the uplink and send these packets to multiple downlink spot beam destinations in support of multicast services. In this manner, satellite 101 can retain broad distribution capabilities of the bent-pipe satellite systems, while providing flexibility and efficiency in terms of bandwidth usage.

In the system 100, the STs 103, 105, 107 originate traffic from a particular coverage area and may exchange data among other STs (not shown). Under this architecture, the hosts 111, 113, 115 can communicate from one VSAT ST to another directly with one satellite hop—in a mesh connectivity. By way of example, the ST 103 supports two separate local area networks (LANs) 117, 119, which communicate via a router 121. The ST 103 is linked to the LAN 117 through router 123. Similarly, the STs 105, 107 can provide connectivity by a LAN 125, which supports one or more hosts 115. The LAN 125 communicates with the ST 105 through a router 127. It is noted that the STs 103, 105, 107 can alternatively support a single host directly connected to the ST 103, 105, 107. The generated traffic from these STs 103, 105, 107 is transferred through the FPS of the satellite 101 and terminates at destination STs within the same and/or different coverage area. That is, the destination STs 105, 107 can be within the same coverage area as the originating STs (e.g., ST 103). To effectively transmit traffic to the desired destination ST through the switch of the satellite 101, STs 103, 105, 107 transmit bandwidth requests to the satellite 101 and the NOCC 109 prior to transmitting any data traffic.

A connection that is established between a source ST and a destination ST is controlled by the satellite 101 and the NOCC 109. The NOCC 109, which is based on the ground, provides management functions for the system 100. For example, an ST obtains authorization from the NOCC 109 before making a request to the satellite 101. The NOCC 109 keeps track of the total uplink (and downlink) bandwidth available for connections and will block a connection request if there is insufficient satellite capacity available to satisfy the request.

The satellite 101 implements the bandwidth control function, which includes controlling the allocation of uplink channels and timeslots and mitigating downlink congestion. Satellite 101 examines the requested bandwidth and replies with grants based on downlink resource availability. In an exemplary embodiment, TDMA (Time Division Multiple Access)/FDMA (Frequency Division Multiple Access) uplink channels carry traffic that is regulated by request/grant bandwidth control processes.

The satellite system 100 provides end-users with connection-oriented services, which make use of capacity allocated to Network Service Providers (NSPs) according to uplink cells, downlink microcells, and/or shaped beams, and also make use of point-to-point and point-to-multipoint packet delivery mechanisms. According to one embodiment of the present invention, the system 100 dynamically changes between the delivery mechanisms as STs join and leave the multicast session. In point-to-point, data from a single ST is delivered to a destination port of another ST. The point-to-multipoint delivery mechanism includes multicast, broadcast, cellcast, and microcast. With multicast, the system 100 delivers data from an ST to the downlink microcells of each participant ST using packet replication in the satellite 101. In some instances, the multicast service delivers data using the CONUS broadcast service depending on the coverage area and number of participants. With the broadcast service, the system 100 delivers data from an ST to the CONUS beam and possibly to outlying microcells as well. In a cellcast, system information messages are transmitted to the STs within an uplink cell; these messages can be sent as a single packet at a higher power level or as multiple microcasts during, for example, a rainfade. In the microcast service, a packet from a single ST is delivered to STs within a single downlink microcell. The system 100 supports connection management functionalities for setting up, modifying, and tearing down connections.

As a hub station, the NOCC 109 manages and controls communication services and operations. For example, the NOCC 109 provisions and identifies the communication channels that are to be allocated. The NOCC 109 is responsible for controlling the bandwidth that is made available to the STs 103, 105, 107. The NOCC 109 can support multiple receive channels (referred to as outroutes or downlinks) and multiple return channels (inroutes or uplinks); however, the NOCC 109 can be configured to provide no return channels, depending on the application. That is, the receive channels support communication from the NOCC 109 to the STs 103, 105, 107, while the return channels (if available) provide communication from the STs 103, 105, 107 to the NOCC 109.

The multicast services provide host user applications with (Internet Protocol) IP layer and multicast-capable interface access to the multicast/broadcast capability of the satellite network 100. Multicasting as supported by the system 100, like IP multicasting, achieves efficient multipoint delivery through the use of Satellite Terminal (ST) port groups, referred to as multicast groups. A multicast group is a group of one or more ST ports that is identified by a single Multicast Group Identification Number (MGID) destination address, which is unique system-wide per satellite.

There are several aspects to supporting multicast over the system 100: configuration of multicast, multicast setup (static and dynamic), multicast group management (e.g., IGMP (Internet Group Management Protocol) processing—supporting dynamic join and leave operations, multicast routing protocols (e.g., Protocol Independent Multicast—Sparse Mode (PIM-SM), and multicast teardown. To effectively provide the multicast service, the system 100 utilizes various Layer 2 services—i.e., Data Link Layer of the Open Systems Interconnection (OSI) model—to support the various multicast protocols utilized by the terrestrial routers 121, 123, 127. These multicast protocols include, for example, Internet Group Management Protocol (IGMP) and Protocol Independent Multicast-Sparse Mode (PIM-SM). IGMP resides at the Network Layer of the OSI model, and is described in Internet Engineering Task Force (IETF) Request for Comments (RFC) 2236, which is incorporated herein by reference in its entirety. Additionally, details of PIM-SM are described in IETF RFC 2362, which is incorporated herein by reference in its entirety.

The STs 103, 105, 107 essentially intercept the IGMP and PIM-SM IP signaling traffic to set up a distribution (replication) tree at Layer 2. Multicast routing protocols enable multicast forwarding of packets addressed to members in the multicast group. Since IP multicasting allows group members to join or leave a host group at any time, the topology of a group's multicast delivery tree can change, and the routing protocols keep track of those changes. Data is forwarded only to those STs that have multicast members connected to them.

The system 100 supports two IP multicast service models. The multicast service identified by a single IP multicast destination address, namely, "host group" is known as the Internet Standard Multicast (ISM) service. The IP multicast service identified by an IP multicast destination address and a unicast source host IP address, namely a "channel" is known as Source Specific Multicast (SSM) service. As used herein, the terms multicast group, host group and channel have distinct definitions. As mentioned above, a multicast group refers a group of ST ports within the satellite network identified by a single, unique Multicast Group Identification Number (MGID) destination address. IP multicasting achieves efficient multipoint delivery through the use of host (network computer devices) groups or channels. A host group is a group of zero or more hosts that are identified by a single Class D IP destination address for the Internet Standard Multicast (ISM) model. For Source-Specific Multicast (SSM) model, a channel is defined as a group of one or more hosts that is identified by a single Class D IP destination address and a source host IP address. In ISM, host groups can be permanent or transient. A permanent group has a well-known, administratively assigned IP multicast address. In permanent host groups, it is the address of the group that is permanent, not its membership; and, the number of group members can fluctuate, even dropping to zero. IP addresses that are not reserved for permanent host groups are available for dynamic assignment to transient groups. Transient groups exist as long as they have one or more members. In SSM, channel members are transient, fluctuating from one or more host members. When membership drops to zero, the channel does not exist.

The Layer 2 services of the system 100, in part, shield the delivery mechanisms of the system 100 from the Internet Protocol (IP) layer. The Layer 2 services employ a common ST state machine and Satellite Independent-Service Access Point (SI-SAP) messages, in which the information elements may be different. These Layer 2 services also accommodate differences in Layer 2 address spaces in providing address resolution between the Class D multicast IP address and the Layer 2 multicast group ID. In addition, the satellite system 100 can adopt different Layer 2 services depending on the multicast service requirements. For example, the system 100 can change the Layer 2 functions from source distribution (multiple unicast), to satellite distribution (multicast), and to single beam broadcast for resource efficiency purposes, as more fully described in FIGS. 6-9.

Multicast operation of the system 100 can be performed on demand or be scheduled by the source. For on-demand operation, multicast setup is triggered by data flow or customer premises protocol. An on-demand session may have participants that are preconfigured or may allow potential participants to join dynamically after the session has been set up. For scheduled operation, multicast setup is based on time triggers, which are configured, for example, by a Network Service Provider (NSP) and the NOCC 109. In other words, the NSP can request that a multicast session among group members be set up in advance. A scheduled session may have participants that are static (preconfigured), or may allow potential participants to join and leave dynamically after the session has been set up. That is, the multicast participation can be static or dynamic. For dynamic participation in multicast sessions, the system 100 implements a receiver-based multicast, as to enhance scalability.

A multicast group is a common interest group of parties that can participate in multicast sessions. A multicast session is a specific instance of multicast communication by a multicast group defined by its parameters (e.g., rate), participants, and time of existence. The source or origination ST is the root node of the multicast session and is an ST that can transmit data to a particular multicast session. In the example of FIG. 1, the host 111 is a source host, and thus, the ST 103 is considered the source ST. A destination ST is a leaf node of the multicast session and is an ST that receives data from a particular multicast session, which under this scenario is ST 105. It is noted that the system 100 can support multiple root nodes in a multicast session.

By way of example, the host 111 serves as a source for a multicast session in which the host 115 is a receiver. The host 115, as a receiver, uses IGMP to alert the router 127 that the host 115 seeks to participate in a multicast session to receive data from the source host 111. As a designated ST 105 for the end host 115, the ST 105 receives the IGMP join request. Based on receiving the IGMP request, the receiving ST 105 sends its address information to the NOCC 109. The NOCC 109 can admit the join request and, if necessary, request an update to the multicast distribution tree to ensure that multicast data arriving at the satellite 101 is replicated and sent to this ST 105. The ST 105 then forwards the data over the LAN 125 to the port of the requesting host 115. It is noted that subsequent IGMP requests from other ports of other hosts (not shown) on the LAN 125 do not require a new Dynamic Join request with the NOCC 109; the ST 105 can locally replicate data to the port of the new host that joined. It is noted that the ST 105 need not signal to the NOCC 109, if the ST 105 is receiving a periodic indication information that the particular microcell has already joined the MGID.

Figure 2:
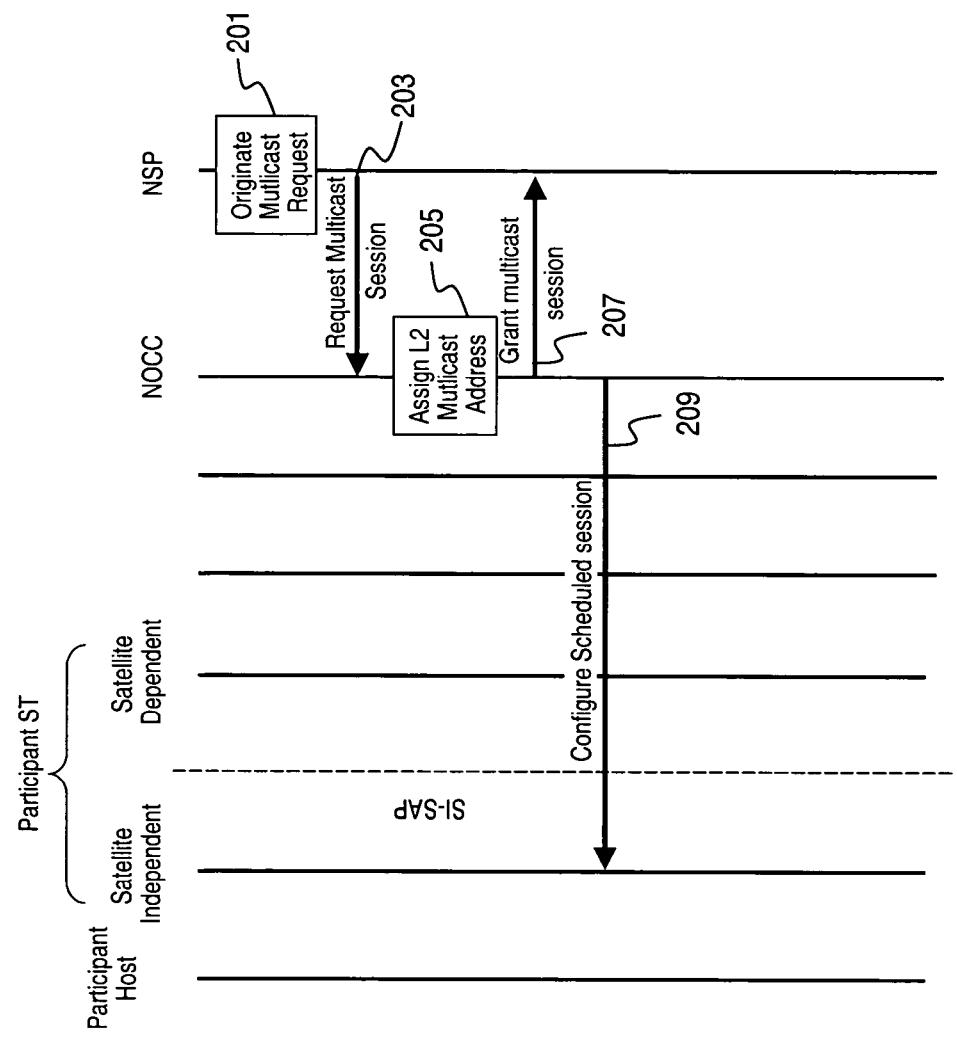
FIG. 2 is a diagram of a process for setup of scheduled multicast sessions, according to an embodiment of the present invention.

FIG. 2 is a diagram of a process for setup of scheduled multicast sessions, according to an embodiment of the present invention. To establish the multicast session, the NOCC 109 configures the participating STs 103, 105, 107, and the payload of the satellite 101. In this example, it is assumed that a network service provider (NSP) is the owner of multicast sessions that are scheduled for ST participation, and thus, provides the NOCC 109 with the session details (i.e., configuration parameters). With the scheduled multicast service, a single source ST 103 is pre-configured for a static or a dynamic multicast session, respectively, with a scheduled start time. The ST receivers (e.g., ST 105) have the MGID and associated receiver information. Accordingly, the configuration parameters include the session start time, prior to the start of the multicast session. Table 1, below, lists exemplary configuration parameters for a scheduled multicast.

TABLE 1

| Scheduled Multicast Source ST Configuration Parameters Field | Size | Type |
| --- | --- | --- |
| Start Time | 4 bytes | Time |
| Session Duration Time | 4 bytes | Not Applicable |
| Repeat Interval | Not Applicable | Not Applicable |
| Input Port ID | 4 bytes (IPv4) or 16 bytes (IPv6) | IP Subnetwork ID |
| Source Host IP Address (For Source-Specific Multicast) | 4 bytes (IPv4) or 16 bytes (IPv6) | Unicast IP address |
| Rate | 4 bytes | Not Applicable |
| Host Group ID | 4 bytes (IPv4) or 16 bytes (IPv6) | Class D IP Multicast Address |
| Rendezvous Point | 4 bytes (IPv4) or 16 bytes (IPv6) | Unicast IP address |
| Rendezvous Point Indicator | 1 byte | Virtual or Normal RP |
| Multicast Group Identification Number | 3 bytes (18 bits used) | MGID |
| Port Classification Rules | Variable length | Not Applicable |

For example, the Start Time field specifies the time at which multicast connection setup begins and is 4-bytes in length. The Session Duration Time field specifies the length in time units that a multicast session will last. The Repeat Interval Time field indicates the delay interval, in time units, that a multicast connection setup is to be repeated for another multicast session. The Input Port ID field is a 4-byte field for IPv4 support or 16-byte field for IPv6 support, which specifies the ST port on which the multicast datagram is received. The Source Host IP Address field specifies the IP address of a multicast source (multicast server), and is a 4-byte field for IPv4 support or 16-byte field for IPv6 support. The Rate field stores the rate at which datagrams are transmitted in bits per second. The Host Group ID field specifies an IP address that defines a host group participating in a specific multicast session. The Rendezvous Point field provides a unicast IP address of the router acting as the RP. The Rendezvous Point Indicator field indicates whether the Rendezvous Point field contains the IP address of a normal or virtual Rendezvous Point (i.e., source ST acting as the RP). The Multicast Group Identification Number (MGID) field defines the destination address of the multicast group (set of STs) participating in a specific multicast session; as used herein, MGID is used synonymously with Layer 2 multicast address. Lastly, the Port Classification Rules field is a variable length field, which specifies the rules that govern communication on a specific port. Notably, such Rules govern the identification of the multicast stream an the priority at which the stream will be transmitted. Based on the above information, the NOCC 109 configures the payload with the appropriate parameters to handle multicast traffic for a specific multicast session, if necessary.

After the NSP has set up the multicast, a preconfigured session or dynamic join can take place, depending on the session type. Specifically, the NSP, as in steps 201 and 203, originates a multicast request and transmits the request to the NOCC 109 for establishment of a future multicast session. If this multicast session is to be preconfigured, the request specifies the list of STs that will participate in the session as well. For dynamic membership sessions, the potential ST participants are also included in the request.

In step 205, the NOCC 109 assigns a Layer 2 multicast address, which maps to a Class D multicast IP address, for the multicast session. The NOCC 109, per step 207, sends the NSP a confirmation that the multicast session has been scheduled. In step 209, the NOCC 109 sends to all the known participating STs (e.g., ST 115) the configuration information for the scheduled session; such information includes the start time, duration, Class D multicast IP address, Layer 2 multicast address, and rate associated with the multicast session.

The source ST 103 can receive additional information required to establish the multicast session at the time of the scheduled multicast. For example, if necessary, new classifier rules are provided to the source ST 103 to allow the ST 103 to map incoming user data into the scheduled multicast session. The source ST 103 monitors the destination address IP header field of all IP datagrams on each active port. If a class D IP destination address is detected, it is compared with a list of configured class D IP destination addresses expected to arrive on the port that the datagram is received. If the class D IP destination address of the datagram does not match any in the list for that port, the datagram is routed to another ST port or it is silently discarded. If there is a match, the source ST 103 maps the destination address to the corresponding Multicast Group Identification Number for that domain. It is noted that ST ports are assigned a domain, which guarantees that the class D IP destination address is unique within the domain.

As mentioned, the system 100 supports both static and dynamic scheduled multicast sessions. In the static case, the multicast group membership is pre-determined and does not change; that is, the configuration occurs at session start time even though the support for the capacity can be predetermined, and does not need to change during the session. The type of datagram distribution mechanism (as more fully described below in FIGS. 6-9), CONUS or packet replication or microcast, is pre-configured (for the dynamic case) at the payload of the satellite 101 since the ST receivers, actually participating in the session at any given instance, are known. Multicast group membership in scheduled static multicast service is limited to the pre-configured ST receivers. An ST cannot dynamically join a scheduled static multicast service. This Scheduled Static Multicast service does not employ multicast routing.

With the Scheduled Dynamic Multicast session, group membership can fluctuate dynamically. An ST can join the multicast session as long as there is a host on its terrestrial network that seeks to receive datagrams and leaves the session when there is no host receiver on its terrestrial network. The type of datagram distribution mechanism, CONUS or packet replication or microcast, is unknown prior to start time, and therefore, it is dynamically configured, if necessary, when an ST dynamically joins a multicast session. In contrast to the static case, the Scheduled Dynamic Multicast service employs multicast routing, such as PIM-SM protocol.

In an exemplary embodiment, the destination ST 105 maintains a configuration table (shown in Table 2) containing pertinent information relating to the multicast service; this information is in support of either Scheduled or On-demand Multicast Service in a static multicast session.

TABLE 2

| Static Scheduled Multicast Session Configuration Parameters Field | Size | Type |
| --- | --- | --- |
| Host Group ID | 4 bytes (IPv4) or 16 bytes (IPv6) | Class D IP Multicast Address |
| Source Host IP Address (For Source-Specific Multicast) | 4 bytes (IPv4) or 16 bytes (IPv6) | Unicast IP address |
| Multicast Group Identification Number | 3 bytes (18 bits used) | MGID |
| Active Port List | Variable Length | Not Applicable |
| Session Indicator Flag (Static) | 1 byte | Boolean |

In addition to the Host Group ID, Source Host IP Address, and MGID fields, the destination ST utilizes an Active Port List field for specifying the ST ports participating in a specific multicast session. The Active Port List parameter is valid for either Scheduled or On-demand multicast service in a static multicast session only. The Session Indicator field is a 1-byte field, which specifies whether a multicast session is static or dynamic multicast session.

In a dynamic session, the configuration table of the destination ST is that of Table 3.

TABLE 3

| Dynamic Scheduled Multicast Session Configuration Parameters Field | Size | Type |
| --- | --- | --- |
| Host Group ID | 4 bytes (IPv4) or 16 bytes (IPv6) | Class D IP Multicast Address |
| Source Host IP Address (For Source-Specific Multicast) | 4 bytes (IPv4) or 16 bytes (IPv6) | Unicast IP Address |
| Rendezvous Point | 4 bytes (IPv4) or 16 bytes (IPv6) | Unicast IP Address |
| Multicast Group Identification Number | 3 bytes (18 bits used) | MGID |
| Eligible Port List | Variable Length | Not Applicable |

TABLE 3-continued

| Dynamic Scheduled Multicast Session Configuration Parameters Field | Size | Type |
| --- | --- | --- |
| Session Indicator (Dynamic flag) | 1 byte | Boolean |

Under this scenario, the configuration table provides a Rendezvous Point field, which specifies a unicast IP address of the router acting as the RP. The Eligible Port List field specifies the ST ports qualified in participating in a specific multicast session, and is germane only with respect to dynamic multicast session. The destination ST also uses a Session Indicator field to specify whether a multicast session is dynamic or static.

Once the multicast session is established, the destination or receiving ST 105 monitors the MGID destination address field in the packet header of all packets received from the satellite 101. If an MGID destination address is detected, it is compared with a list of configured MGID destination addresses expected to arrive on the air interface. If the MGID destination address of the packet does not match any in the list for the air interface, the packet is silently discarded. If there is a match and the session is static, the receiving ST 105 forwards the datagram according to the output ST port list configured in the multicast session information table. If the multicast session information indicates more than one output ST port, the ST 105 replicates the datagram and forwards it on each port in the output port list. It is noted that the ST 105 assumes that the datagram is valid on the ports on which it is forwarded since the configuration of the output list is provided by the NOCC 109.

According to one embodiment of the present invention, the NOCC 109 enforces Community of Interest (COI) restrictions. If there is a match and the session is dynamic, the receiving ST 105 forwards the datagram according to the output ST port list, in the dynamically created route entry, indicating output ports with group members. For a Scheduled dynamic session, the ST 105 validates the ST port by checking that a PIM Join membership message is valid on the ST port on which it is received.

After successful Scheduled Multicast Connection setup, the source ST 103 starts an End of Service timer. When the timer expires, the source ST 103 stops sending datagrams and sends a Scheduled Multicast Service Release message to the NOCC 109. The NOCC 109 de-allocates all resources that it has allocated to the session and sends an acknowledgment to the source ST 103. Upon receiving an acknowledgment from the NOCC 109, the source ST 103 frees all resources allocated to the session.

If the Scheduled multicast session is dynamic, group membership is dynamic. Accordingly, the NOCC 109 maintains group membership "state" by monitoring the number of microcells, which have group membership. When group membership drops to zero in all affected microcells, the NOCC 109 sends a command to the payload of the satellite 101 to update the satellite address, e.g., Replication Group Number (RGN). For illustrative purposes, the unique satellite addressing is explained through the use of RGN, although other addressing schemes are contemplated to support switching and replicating the multicast packets. The replication group number is translated into a set of destination microcells and/or an indication to use CONUS. This scenario focuses on the case where the RGN is resolved into a set of destination microcells; however, the operation using CONUS is the same except for packet replication. As a result, datagrams that are destined to a multicast group are not forwarded to a microcell with no group members. The NOCC 109 sends a Scheduled Multicast Service "Multicast Session Pause" Indication to the source ST 103. The source ST 103 sends an acknowledgment back to the NOCC 109. Then, the source ST 103 temporarily stops transmitting datagrams to the group and waits until the End of Service timer expires or the source ST 103 receives a Multicast Session Resume message from the NOCC 109 allowing the multicast service to resume. This process temporarily suspends the multicast session until, for example, STs with group members on their respective LANs join the multicast session.

Figure 3:
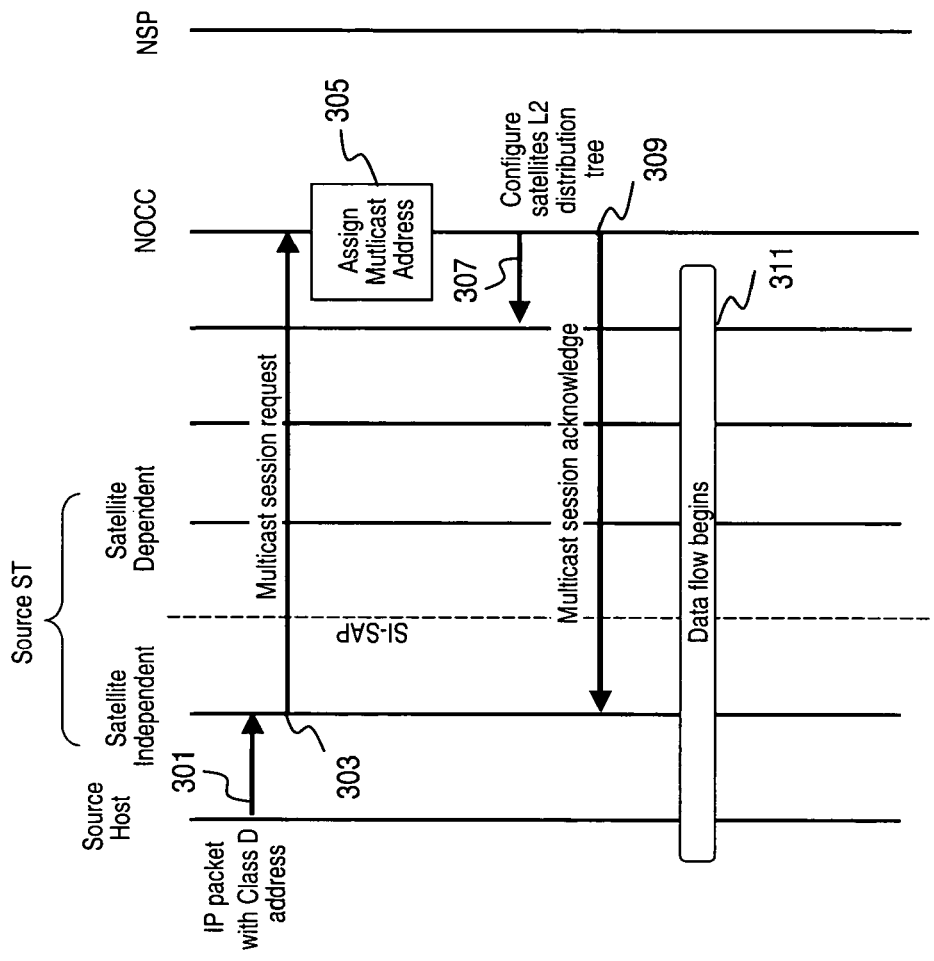
FIG. 3 is a diagram of a process for setup of on-demand multicast sessions, according to an embodiment of the present invention.

FIG. 3 is a diagram of a process for setup of on-demand multicast sessions, according to an embodiment of the present invention. On-demand Multicast Service has an unscheduled start time in which multiple potential source STs and one or more pre-configured ST receivers or one or more potential ST receivers are pre-configured for a static or a dynamic multicast session, respectively, with the multicast session parameters. For example, the configuration parameters (as shown in Table 4) include the start of session trigger classification, prior to the start of the session.

TABLE 4

| On-Demand Multicast Source ST Parameters after Connection Setup Field | Size | Type |
| --- | --- | --- |
| Start Time | 4 bytes | Time |
| Session Duration Time | 4 bytes | Not Applicable |
| Input Port ID | 4 bytes (IPv4) or 16 bytes (IPv6) | IP Subnetwork ID |
| Rate | 4 bytes | Not Applicable |
| Host Group ID | 4 bytes (IPv4) or 16 bytes (IPv6) | Class D IP Multicast Address |
| Source Host IP Address (For Source-Specific Multicast) | 4 bytes (IPv4) or 16 bytes (IPv6) | Unicast IP address |
| Multicast Group Identification Number | 3 bytes (18 bits used) | MGID |
| Port Classification Rules | Variable length | Not Applicable |
| Multicast Service type | 1 byte | Scheduled or On-demand service and Static or Dynamic session |
| ST Destination Information | Not Applicable | Not Applicable |
| Rendezvous Point | 4 bytes (IPv4) or 16 bytes (IPv6) | Unicast IP address |

Under this scenario, the source host 103 can, on demand, set up a multicast session, whereby the on-demand multicast session can be stimulated by IP data with a multicast class EP address or by a signaling request to set up multicast. In an exemplary embodiment, the source ST 103 is configured with the appropriate classification rules before the ST 103 can launch a multicast session setup request to the NOCC 109. It is noted that the Rate is optional, and can be learned, for example, from the protocol that triggers the multicast session.

In step 301, the source host 103 generates a packet that contains a stimulus, such as a Class D multicast IP address, to launch a multicast session. A multicast-enabled ST is configured with the classification rules of the On-demand multicast service and the MGID destination address. The classification rules include a class D IP destination address. On-demand multicast connection setup (OMCS) is initiated by a potential source ST 103 in a multicast session. On demand multicast connection setup may be triggered by data pattern in a specific IP multicast datagram or the class D IP destination address of the multicast datagram to setup a multicast connection. That is, the stimulus can be any user data, including International Telecommunications Union (ITU) H.323, and Internet Engineering Task Force (IEETF) Session Initiation Protocol (SIP), or other multicast protocols.

When the source of the trigger for multicast connection setup is detected in a datagram or one of the above triggers, any of the potential source STs 105, 107 can initiate an OMCS by sending a Multicast Connection Setup Request, with connection parameters, to the NOCC 109, per step 303. The request includes information such as desired rate and IP multicast address. The source ST 103 maintains a retry timer ("Multicast Connection Setup Request Timer") to guarantee acknowledgment (i.e., reception) of the request message. When the Multicast Connection Setup request is received, the NOCC 109 processes the request as follows. The NOCC 109 verifies whether the source ST 103 is permitted to initiate a multicast connection request with associated parameters with admission control, and determines whether system capacity is exceeded based on the associated request parameters. Multicast service may be denied based on lack of system resources, service access restriction or Community of Interests restrictions. For On-demand dynamic multicast session, the NOCC 109 verifies if it has received a Dynamic Join from an ST 105, 107 in the multicast group for which the connection setup is being requested. If there is one or more receiving STs 105, 107 in the group that have joined, the NOCC 109 proceeds with the processing of the connection setup request. If there is no active receiver, the NOCC 109 sends a "Connection Setup In-progress" message to the source ST 103. The NOCC 109 maintains a "Connection Setup In-progress" state for the group and checks the "Connection Setup In-progress" state with each Dynamic Join received. When a Dynamic Join from a receiving ST 105, 107 is received for the group, the NOCC 109 deletes the "Connection Setup In-progress" state and resumes the processing of the connection setup request. Generally, it is probable that joins occur before a connection trigger in a large number of scenarios, as the PIM-SM stream that is sent upstream by the source ST upon notification of a join is the cause of the data flow; if the data triggers the connection, then the connection does not occur until data has arrived.

The NOCC 109 resolves the multicast group members ST addresses to the destination downlink microcell. The NOCC 109 analyzes the microcell distribution for the group and determines the type of satellite broadcast required for the multicast service; i.e., CONUS, microcast, or packet replication. If packet replication is required, the NOCC 109 reserves a replication group number (RGN), which is used for mapping to a set of destination microcells and/or an indication to use CONUS. This scenario focuses on the case where the RGN is resolved into a set of destination microcells; however, the operation using CONUS is the same except for packet replication. It is noted that if an RGN is unavailable, the multicast connection request is denied. If the number of congested downlinks is greater than the configured threshold, and packet replication is being used, the multicast connection request is denied. Otherwise, the request is granted, excluding the congested downlinks. The NOCC 109 grants request and sends confirmation and session information to source ST 103 (i.e., RGN, CONUS address, or downlink microcell number) when security and capacity checks are completed successfully.

In step 305, the NOCC 109 assigns a multicast address (i.e., MGID), and configures the satellite 101 with the Layer 2 distribution tree, per step 307. The NOCC 109 also sends a multicast session acknowledgement, per step 309, to the source ST 103; the acknowledgement, in part, specifies the assigned multicast address. Subsequently, the source host 103 can support the dataflow (step 311). While the On-demand connection setup is in progress (i.e., the NOCC 109 processes the request), the source ST 103 discards multicast datagrams it receives for the group. After connection setup is completed, the multicast communication session begins. The source ST 103 transmits multicast datagrams received over an air interface. The source ST 103 restarts an On-demand Multicast Session Timer, for every datagram that it transmits, to timeout a session. Optionally, the On-demand Multicast Session Timer may be restarted by periodic checking of the matching datagram count. The source ST 103 uses the pre-configured classifier rules to map incoming user data to the on-demand multicast session.

If the multicast uses satellite packet replication, the NOCC 109 sends the required information to one or more satellites 101. If no leaf hosts have yet to join the multicast session, the step of assigning the Multicast Group ID and updating the satellite 101 may be delayed. Multicast session management procedures are completed to establish the multicast session. For situations in which there are no ST receivers who have yet joined a dynamic on-demand session, the NOCC 109 sends the source ST 103 a Progress message that starts a longer timer cycle. The ST 103 either times out if no receivers join or the ST 103 receives a session established message that contains the destination information required to address multicast packets for transmission for the receiver(s) that joined.

In support of the On-demand Multicast Service (static or dynamic), the source ST 103 maintains a configuration table with pertinent parameters, as enumerated in Table 5, below.

TABLE 5

| Source ST On-demand Multicast Configuration Parameters Field | Size | Type |
| --- | --- | --- |
| Input Port ID | 4 bytes (IPv4) or 16 bytes (IPv6) | IP Subnetwork ID |
| Rate | 4 bytes | Not Applicable |
| Host Group ID | 4 bytes (IPv4) or 16 bytes (IPv6) | Class D IP Multicast Address |
| Source Host IP Address (For Source-Specific Multicast) | 4 bytes (IPv4) or 16 bytes (IPv6) | Unicast IP address |
| Multicast Group Identification Number | 3 bytes (18 bits used) | MGID |
| Port Classification Rules | Variable length | Not Applicable |
| Rendezvous Point | 4 bytes (IPv4) or 16 bytes (IPv6) | Unicast IP address |

The configuration table of the source ST 103 can store an Input Port ID parameter for identifying the ST port on which the multicast datagram is received from the source host 111. The configuration table also includes the Rate, the Host Group ID, the Source Host IP Address, and the Multicast Group Identification Number. Further, the source ST 103 utilizes a Port Classification Rules field, which specifies the rules that govern communication on a specific port. A Rendezvous Point field is provided to indicate the unicast IP address of the router acting as the RP.

The destination ST 105 also maintains a configuration table in support of the On-demand multicast service. In the on-demand static scenario, the ST 105 stores similar parameters as in the Static Scheduled Multicast service of Table 2. The dynamic case requires storing parameters, as in those in the scheduled scenario—i.e., Table 3.

Figure 4:
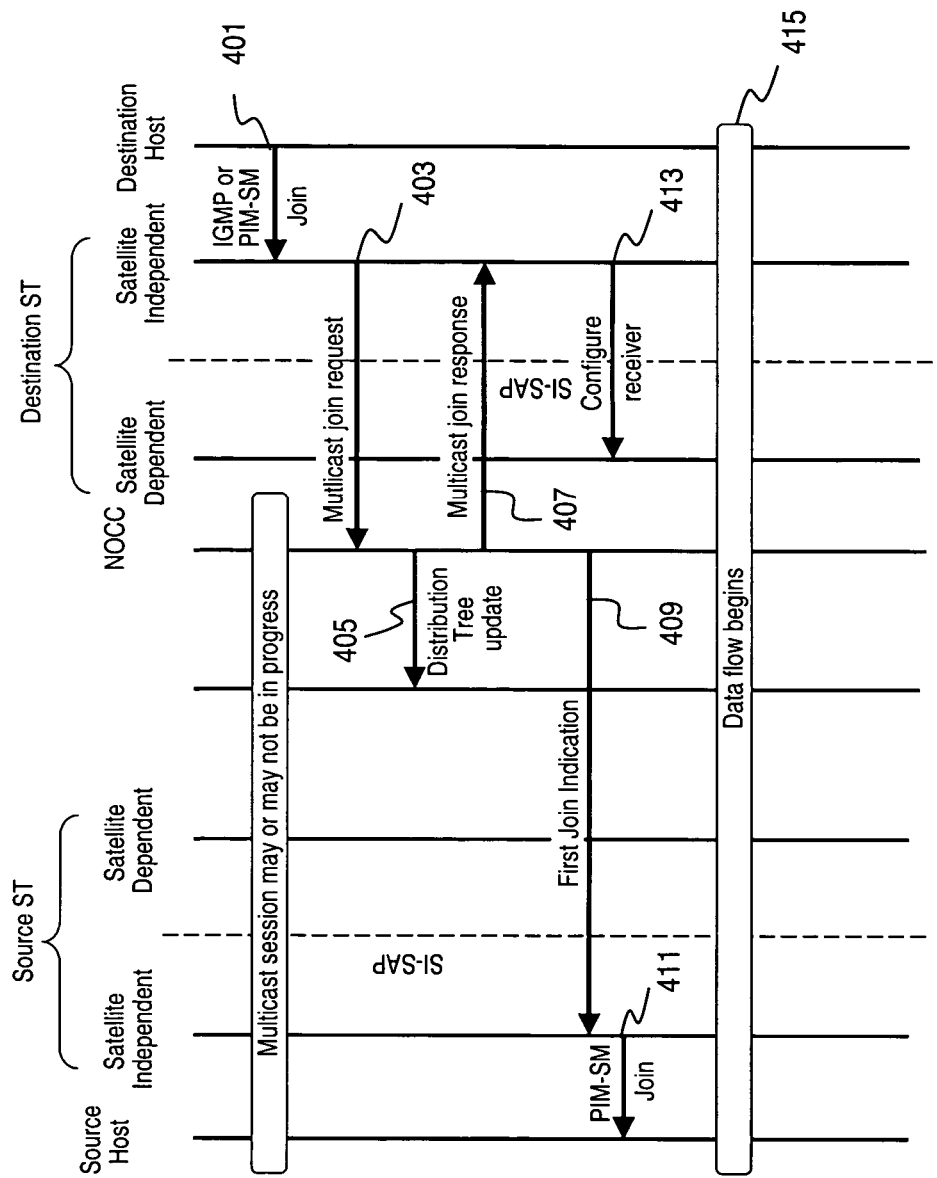
FIG. 4 is a diagram of a dynamic join process, according to an embodiment of the present invention.

FIG. 4 is a diagram of a dynamic join process, according to an embodiment of the present invention. For the purposes of explanation, it is assumed that a multicast session is already active with an assigned Layer 2 multicast address when the destination host 115 requests to join the multicast session. Under this scenario, the destination ST 105 is pre-configured with the Class D Multicast IP address of the multicast session along with the list of eligible ports. Also, the destination host 115 has previously received details regarding the multicast session, such as the Class D Multicast IP address of the multicast session from an application level mechanism (e.g., web page). The session may or may not be active when the host 115 attempts to join. The destination host 115, per step 401, requests to join a multicast via an IGMP message or a multicast routing protocol join message (e.g., PIM-SM message). It is noted that an ST that is not attached directly to the LAN 125 of the requesting host 115 will not receive an IGMP message, but will receive a multicast routing protocol message (e.g., PIM-SM join) if the routers along the path support multicast.

In step 403, the destination ST 105 receives the PIM-SM message or IGMP message and, if configured to do so, creates a message to the NOCC 109 to join the multicast—if the ST 105 is authorized. That is, the ST 105 receives either the IGMP message or a PIM-SM join message, if a multicast-capable router (e.g., router 127) exists between the host 115 and the ST 105. The request is checked locally against the ST configuration (e.g., eligible port list) by the ST 105 to determine whether the ST 105 has permission to request participation in the session.

Based on the request, the NOCC 109 determines whether the destination ST 105 has the ability to participate in this particular multicast session (e.g., checks user group restrictions). The NOCC 109, as in step 405, generates an update to the distribution tree, if necessary. The NOCC 109 determines if the received message is the first join message of the multicast or the last prune message of the multicast within the system 100. If so, the NOCC 109 sends a message, as in step 409, to the source ST 111 that prompts the source ST 103 to generate a PIM-SM join or prune message towards the Rendezvous Point (RP) using the unicast routing information (step 411). An ST may support the functionality of acting as a Candidate RP or a Bootstrap Router (BSR). The NOCC 109 then grants permission for the receiving ST 105 to join the multicast, per step 407.

Upon receiving the grant to join the session, the destination ST 105 configures its receiver to accept packets destined for the Layer 2 multicast address (step 413). At this time, the receiving ST 105, as in step 415, may immediately start to receive data. For an existing session, the origination ST data is also forwarded to the new participant as well as all existing participants. If the ST 105 is the first in the system 100 to join the multicast, the NOCC 109 also sends a message to the source ST port in order to prompt the ST 103 to generate a PIM-SM join message to build the multicast tree. The source ST 103 sends the appropriate PIM-SM join message upstream towards the Rendezvous Point (RP). The RP may be directly connected to the ST 103 or the message may need to traverse through one or more multicast-capable routers (e.g., routers 121, 123) on the terrestrial network.

Figure 5:
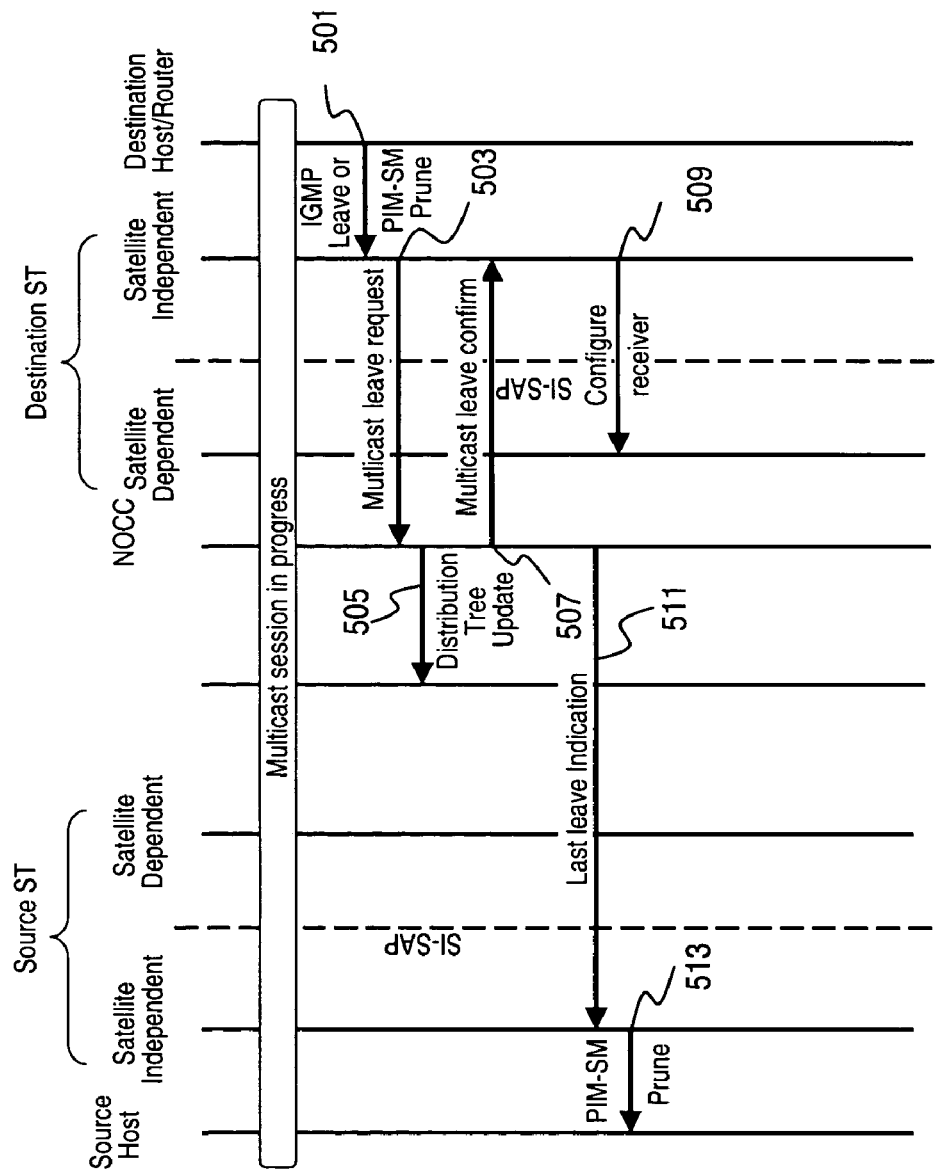
FIG. 5 is a diagram of a dynamic leave process, according to an embodiment of the present invention.

FIG. 5 is a diagram of a dynamic leave process, according to an embodiment of the present invention. For sessions that allow dynamic membership, any participant can leave the session while the multicast session is active. Upon leaving the session, the current multicast configuration dictates whether this leave affects the distribution tree. The distribution tree is largely unaffected if other STs in the multicast session are still active in the satellite beam; for example, multicast packets are still downlinked to that beam. In other words, the satellite replication table need not be updated. However, the satellite dependent receiver of the ST 105 is reconfigured so that it no longer receives packets for the session.

In the example of FIG. 5, an active multicast session exists, whereby the destination host 115 is receiving data from the multicast session via the ST 105. In step 501, the destination host 115, or router 127, issues a request to leave the multicast. The destination ST 105 receives either the IGMP Leave request or a PIM-SM prune request (if one or more multicast-capable routers are between the host and the ST). Next, assuming the host 115 is the only host served by the ST 105 in the multicast session, the ST 105 launches a Multicast Leave request, per step 503.

In step 505, the NOCC 109 determines whether the removal of the ST 105 from the multicast changes the Layer 2 distribution tree, and updates the distribution tree as needed (step 505). Thereafter, the NOCC 109 confirms, as in step 507, the leave to the ST 105. The ST 105 reconfigures the satellite dependent receiver to no longer receive packets addressed to the Multicast Group ID for this multicast session, per step 509.

The NOCC 109 also sends, as in step 511, a message to the port of the source ST 103 to prompt the ST 103 to generate a PIM-SM prune message upstream, per step 513, out its terrestrial port to teardown the multicast tree, if this is the last ST in the system 100 to leave the Multicast. In addition, the source ST 103 sends the appropriate PIM-SM prune message upstream towards the Rendezvous Point (RP), which may be directly connected to the ST 103 or the message may need to traverse through one or more multicast-capable routers (e.g., routers 121, 123) on the terrestrial network.

A multicast session can be terminated either by reaching the end of a scheduled duration, by signaling from the session owner that the multicast session has ended, or, for sessions that have no duration, when no data has been sent for a configurable amount of time. The NOCC 109 signals the release of the multicast to all the participating STs 103, 105, 107. For on-demand multicast sessions, the parameters of Table 5 are configured in all potential source STs. For scheduled multicast sessions, a time profile (start time, duration, and schedule, as listed in Table 4) is also configured in the source ST 103. For membership in a multicast session, the Class D Multicast Address is configured in the destination STs 105, 107.

Figure 6:
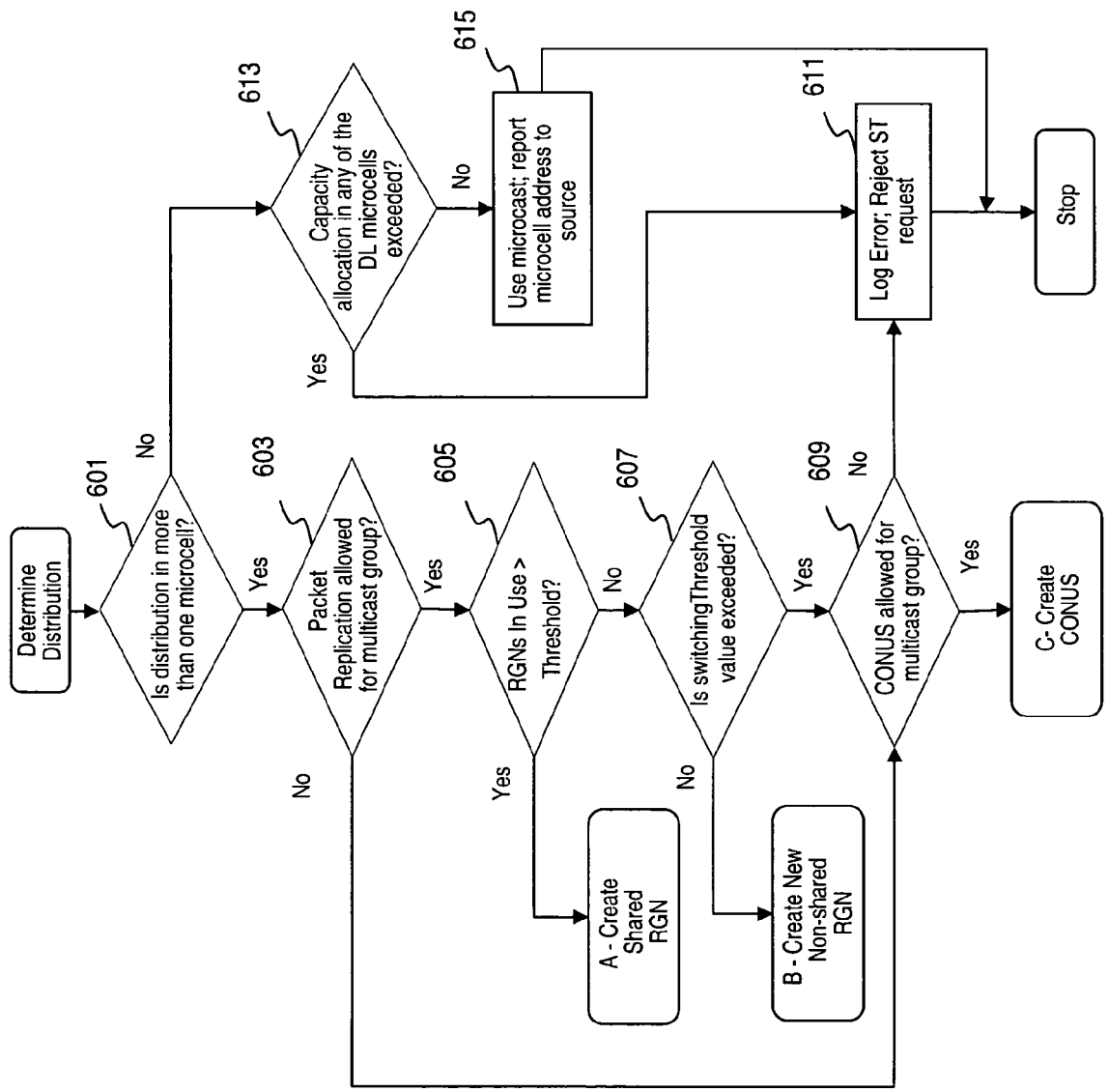
FIG. 6 is a flowchart of a multicast distribution process, according to an embodiment of the present invention.

FIG. 6 is a flowchart of a multicast distribution process, according to an embodiment of the present invention. This process determines the type of multicast packet distribution mechanism for transport of the user data. The particular distribution mechanism depends on the resources available in the system 100 as well as the resources currently in use. The multicast distribution process, according to one embodiment of the present invention, is executed by the NOCC 109. As mentioned, the system 100 provides connection-oriented user multicast services.

The multicast packet distribution types, supported by the system 100, include the following: Microcast, Microcells via packet replication, CONUS left polarity, CONUS right polarity, CONUS left polarity and CONUS right polarity via packet replication, CONUS left polarity and CONUS right polarity plus outlying microcells via packet replication, CONUS left polarity plus outlying microcells via packet replication, and CONUS right polarity plus outlying microcells via packet replication. In each of these distribution schemes (or mechanisms), the packet is addressed to an MGID destination address. With Microcast, a packet, addressed to an MGID destination address, is sent on a single downlink beam to one or more ST virtual ports residing within a single microcell. In the CONUS (left polarity or right polarity) distribution, the packet is sent on the CONUS beam within the CONUS partition to multiple ST virtual ports on the left polarity or right polarity within CONUS coverage.

According to one embodiment of the present invention, the CONUS distribution can be supported by the system 100 as a connectionless Multicast Service, which does not require a connection setup. Also, CONUS distribution utilizes static receivers, and has similarity to the static On-demand Multicast Service; the difference between these services is that CONUS is connectionless, utilizing only CONUS or microcast for datagram distribution. The source ST 103 is pre-configured with the data pattern classification rule and the datagram distribution method for the multicast session. The datagram classification rule enables the source ST 103 to recognize the data pattern, which triggers the multicast session. The datagram distribution mechanism is pre-configured as either microcast or CONUS left polarity or CONUS right polarity.

With Packet Replication, the packet, which is addressed to an Multicast Group Identification (MGID) destination address, is sent on an uplink, and replicated (e.g., up to 40 instances) and sent to up to 40 addresses that could include CONUS left and/or CONUS right. The MGID, in each replicated packet, allows one or more ST virtual ports within each coverage area to receive the packet. In the CONUS Left and CONUS Right distribution, a packet is replicated and sent to all STs listening to the MGID within CONUS across both polarities. For CONUS Left or CONUS Right plus Outlying Cells distribution, the packet is replicated and sent to all STs listening to the MGID on a single polarity as well as microcells outside of CONUS. Lastly, the CONUS Left and CONUS Right plus Outlying Cells distribution involves replicating the packet for transmission to all STs listening to the MGID across both polarities as well as cells outside of CONUS.

The manner in which multicast is distributed is dependent upon the multicast group. The multicast group describes the receivers in the multicast. A static multicast group specifies a preconfigured group of virtual ST ports that receive the multicast automatically upon connection establishment. A dynamic multicast group indicates a potential group of virtual ST ports that only receive the multicast if they join during the multicast connection.

For static multicast, the multicast distribution process determines, based upon the locations of the STs and their distribution across the satellite system 100, how to best distribute the multicast (e.g., CONUS or packet replication to a specific number of microcells). CONUS polarity and the microcell distribution can be determined by the configuration and location of member STs.

Given the many distribution types, the system 100 is tasked to efficiently utilize system resources by selecting the best (i.e., efficient) distribution mechanism to support of the multicast service. To determine the proper distribution mechanism, the multicast distribution process determines whether the multicast group members are in more than microcell, as in step 601. Next in step 603, a determination is made whether packet replication is permitted for the particular multicast group. If packet replication is supported, then the process checks whether the Replication Group Numbers (RGNs) that are in use exceeds a predetermined threshold (step 605); if so, a shared RGN is created, according to Sub-process A. As described previously, the RGN is translated into a set of destination microcells and/or an indication to use CONUS.

According to one embodiment of the present invention, the system 100 supports a number of downlink microcells with two polarities—a left polarity and a right polarity. Assuming that 784 downlink microcells are utilized, a total of 1568 (784×2) addressable downlink microcells results.

The Packet Replication function, however, can only address a portion of the 1568 addressable downlink microcells each instance (e.g., up to only 40). The number of packet Replication Group Number entries, namely RGN, for packet replication can be set to 512, for example.

The number of Replication Group Number (RGN) entries available for user multicast sessions is reusable. That is, multiple multicast sessions can use the same RGN provided each session has a similar distribution of receiving STs 105, 107. The term "similar distribution" as used herein signifies either an equal distribution or a larger distribution encompassing all the receiving STs 105, 107 (i.e., "a superset"). The Replication Group Numbers are assigned without reuse until a threshold is reached. For example, the threshold could be set at (⅔×437) rounded up to the nearest integer. After the RGN threshold is reached, and before a new RGN can be assigned, a search is performed to find an RGN of equal distribution or the nearest superset. An exception to this rule is an RGN assigned for CONUS Left plus CONUS Right. This is a shared RGN that is always shared if the multicast is using both polarities of CONUS.

However, if the threshold is not exceeded, then the process, as in step 607, determines whether a Switching Threshold value is exceeded. For system efficiency, a threshold (termed "Switching Threshold") is set for the number of downlink addresses attained before the distribution method switches to a broadcast type beam, such as CONUS. That is, the Switching Threshold value is set such that system resource efficiency requires a broadcast beam (e.g., CONUS) rather than microcells to serve the numerous receivers. This threshold number may be influenced by cost. Therefore, a NSP or Wholesaler of telecommunication services, for instance, can provide an appropriate threshold value, taking cost into account. If the Switching Threshold value is not exceeded, then a new non-shared RGN is created (Sub-process B). In the event that the Switching Threshold value has been surpassed, the multicast distribution process, as in step 609, checks whether the multicast group can be supported using a CONUS beam; if this is permitted, CONUS distribution is provided, per Sub-process C. If CONUS is not available to the multicast group, then the process registers an error, per step 611.

Turning back to the determination of whether the receivers are in more than one microcell of step 601, if the determination is negative, then the process checks whether the capacity allocation in any of the downlink microcells is exceeded, per step 613. If the capacity allocation is exceeded, then the request by the ST to join the multicast is rejected, per step 611. However, if downlink capacity has available, the microcast distribution is used, and the microcell address is transmitted to the source ST 103 (step 615).

There are conditions when, downlink capacity allocation may fail, perhaps due to errors in provisioning of downlink capacity, and multicast distribution to one or few joined microcells cannot be supported. Reachability Cutoff for a multicast group is defined as the percentage of microcells that need to be "reachable" to continue considering the multicast group as serviceable. Cells may be unreachable because of a few factors, including failure in allocating downlink capacity. The reachability cutoff is compared with the real time fraction of reachable microcells to determine whether it is reasonable to continue with the multicast distribution. For a static multicast group, where the distribution is statically known, the fraction of reachable microcells is computed as the ratio of reachable microcells to the total number of microcells statically configured for the multicast group. For a multicast group in which the distribution is dynamic, this fraction is computed as the ratio of currently joined microcells that are reachable to the total number of microcells that may possibly join (i.e., all microcells that may join in, but have not, at any time are considered reachable at that time for the computation of reachability). If at any time during operation this fraction falls below the reachability cutoff for a multicast group, the corresponding connection is considered unserviceable and is torn down.

A special case in the computation of group reachability arises with respect to the use of a shared RGN, where the multicast group's distribution is a subset of the RGN's distribution. In such a case, reachability is computed only on the microcells that have joined in for the multicast group and not on the microcells that are distributed to merely because they are a part of the shared RGN's distribution. However, downlink capacity checks must still be performed, and if capacity is not available for any microcells belonging to the RGN but not active for the multicast group, the use of such a shared RGN is prohibited for the multicast group.

Unreachable microcells of a reachable multicast group is periodically checked to determine if downlink capacity is available for distribution to these cells. If capacity is determined to be available at any such periodic checks for certain cells, those cells ought to be added to the multicast distribution.

The NOCC 109 can execute the multicast distribution process under a variety of different scenarios. For example, this process can be performed during the initial connection request from a source ST 103. Also, the multicast distribution process can be executed some configurable period after there is a change in group membership in a microcell (i.e., from 0 to 1) as discovered from receipt of a Multicast Join Message, or a Multicast Prune Message. The configurable period from receipt of a Join or a Prune before execution of the distribution process allows the accumulation of multiple joins or prunes for a multicast group to reduce the amount of messaging to the source ST 103 changing the RGN during periods of high activity for the multicast group.

Additionally, the NOCC 109 can start the launch of the process upon receiving a connection disconnection request from a source ST 103, or upon receiving a rate change request from a source ST 103 or an operator within the NOCC 109. Further, the multicast distribution process is executed upon receiving an acknowledgement of an RGN update from the source ST 103, or at a configurable period after sending an RGN update and not receiving a corresponding acknowledgement.

It is noted that when a multicast Connection Request is received, the NOCC 109 ensures that the RGN and/or CONUS resource(s) is available before acknowledging the Connection Request. Accordingly, the satellite 101 is appropriately configured before the acknowledgement is sent to the requester. Also, for all Join/Prune requests that require a change to the RGN used for the connection, the satellite 101 is configured with the new RGN before RGN update message is sent to the source ST 103, thereby ensuring that the source ST 103 does not start multicasting on the new RGN before the satellite 101 is configured.

After execution, the distribution process generates data, including, for example, Number of RGNs in use for user data, Number of RGNs designated as Shared, Number of RGNs designated as SuperSet, and List of addresses currently configured for any RGN, for use by the NOCC operator and traffic engineer for analyzing the usage of the multicast resources.

Figure 7:
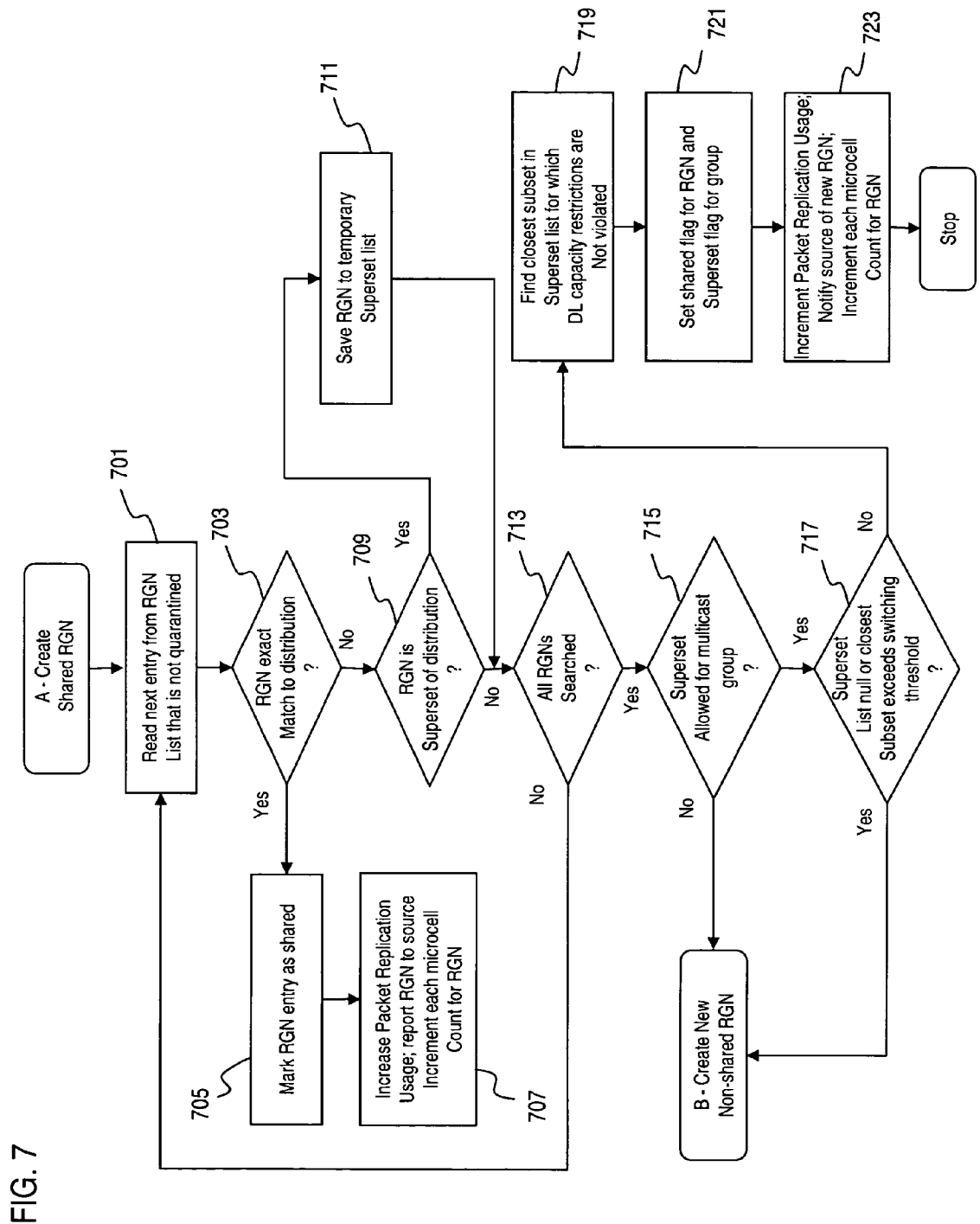
FIG. 7 is a flowchart of a process for creating a shared Replication Group Number (RGN) distribution, in accordance with an embodiment of the present invention.

FIG. 7 is a flowchart of a process for creating a shared Replication Group Number (RGN) distribution, in accordance with an embodiment of the present invention. Any RGN that is set up to support the multicast can be setup at time of multicast connection establishment and marked for removal at the time of multicast connection teardown. Multicasts to static multicast groups do not require a change in the distribution mechanism during a multicast connection unless a multicast group reconfiguration occurs.

For dynamic multicast, the multicast distribution process determines how to best distribute the multicast based upon which STs have joined. If no ST from the dynamic multicast group has joined at the time of connection establishment, the connection is kept in-progress until an ST has successfully joined. If STs have joined prior to connection establishment, a list of microcells is kept by the multicast distribution process so that those microcells can be reached when the connection establishment occurs. During the connection, as STs in microcells join or prune, the multicast distribution process determines whether there is a need to change the distribution. The distribution decision is based upon the microcell of a joining or pruning ST. For multicasts distributed via CONUS, the decision is also based upon the polarity of the potential member STs.

When a change to the RGN that is being used for a multicast group is required, synchronization needs to be addressed. An RGN change may be required, for instance, when a shift from packet replication to CONUS is required as a consequence of a Join. Another example is when a shared RGN that is being used may no longer be updated to accommodate a Join/Prune request, and thus requires that a new RGN, non-shared or shared, be assigned for the multicast group.

Regardless of the cause of the RGN change, the source ST 103 needs to be able to transmit without interruption to the multicast group. Thus, if the NOCC 109 does not verify that a resultant RGN update has been received and applied by the source ST 103 before re-using the old RGN, there exists the possibility that the nature of the multicast distribution can be changed before the source ST 103 applies the RGN update changes, such that the source ST 103 may no longer be distributing to the downlink microcells the source ST 103 ought to reach. As a consequence, whenever an RGN change is required, the multicast distribution process "quarantines" the old RGN until an acknowledgement from the source ST 103 is received indicating that the RGN change has been applied by the source ST 103. A quarantined RGN is prohibited from being changed in ways that may disrupt the usability of the RGN by the multicast group. For a non-shared RGN this requires preserving the RGN; that is, not allowing its reuse by any other multicast group. For simplicity, non-shared quarantined RGNs are not made available for sharing with other multicast groups. For a shared RGN this requires the NOCC 109 to ensure that any future event on a quarantined RGN does not cause the "quarantined" multicast group to experience loss of distribution to any microcell, until the quarantine is removed.

The NOCC 109 maintains a RGN List of RGNs that are not quarantined. In step 701, the process reads an entry from the RGN List, and determines, as in step 703, whether the entry is a match to the distribution. If there is a match, RGN entry is marked as shared, per step 705. Next, in step 707, a Packet Replication Usage counter for tracking usage is increased, and the RGN is reported to the source ST 103; additionally, each microcell Count for the RGN is incremented.

Figure 8:
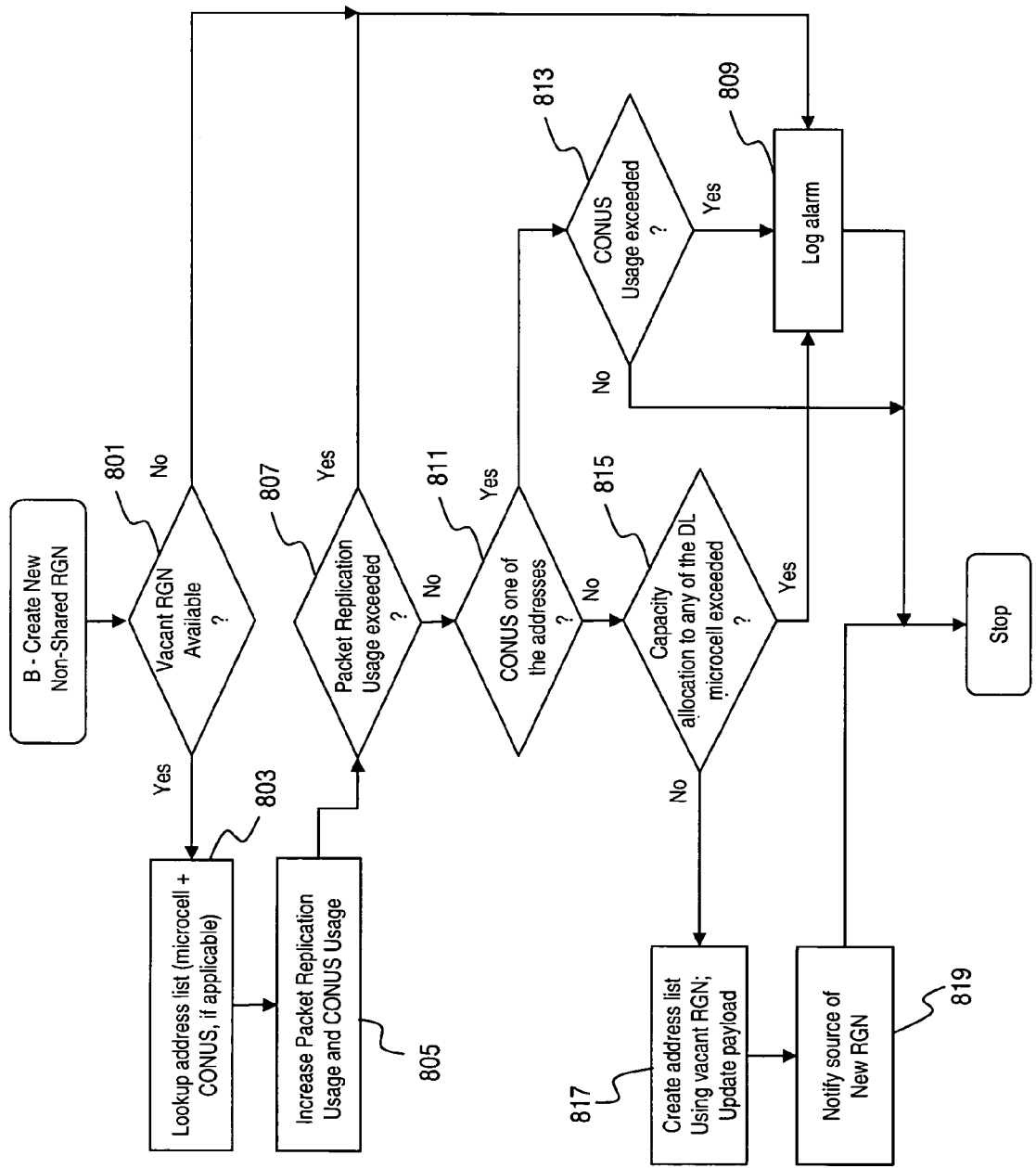
FIG. 8 is a flowchart of a process for creating a non-shared Replication Group Number (RGN) distribution, in accordance with an embodiment of the present invention.

In step 703, if there is no match, the process checks whether the RGN is a superset of the distribution (step 709). At this point, if the RGN is a superset, the RGN is recorded in a temporary list of identified superset, as in step 711. Next, the process determines, as in step 713, whether all RGNs have been examined; if not, the process returns to step 701. The process thereafter considers whether the superset is permitted for the multicast group (step 715). If not, the process proceeds to Sub-process B to create a new non-shared RGN (FIG. 8). If the superset is permitted, the process, as in step 717, determines whether the superset list is null or the closest subset exceeds the Switching Threshold value; if the determination is in the affirmative, the process creates a new non-shared RGN (Sub-process B). Otherwise, the process finds the closest subset in the Superset List for which downlink capacity restrictions are not violated, per step 719. Next, a flag (Shared Flag) indicating the RGN as being shared is set, as well as a flag (Superset Flag) specifying that the group is a superset (step 721). In step 723, the Packet Replication Usage counter is incremented. The process also notifies the source ST 103 of the new RGN, and increments each microcell Count for the RGN.

FIG. 8 is a flowchart of a process for creating a non-shared Replication Group Number (RGN) distribution, in accordance with an embodiment of the present invention. In step 801, the process checks whether is a vacant RGN. If there is an available RGN, the process performs, as in step 803, a lookup of an address list (microcell and CONUS if applicable). Next, in step 805, the process increments the Packet Replication Usage counter and a CONUS Usage counter. The multicast distribution process then determines, in step 807, whether the Packet Replication Usage counter is exceeded; if so, the process triggers an alarm, per step 809. If the Packet Replication Usage counter is not exceeded, the process checks whether CONUS corresponds to one of the addresses found in the address list (step 811). If indeed one of the addresses is CONUS, the process determines whether the CONUS Usage counter is exceeded, as in step 813; if this counter is exceeded, then an alarm is logged (step 809).

In step 815, the process checks whether the capacity allocation to any of the downlink microcell is exceeded. If not, an address list is created containing the vacant RGN, the satellite payload is updated with this information (step 817). Next, the source ST 103 is notified of the new non-shared RGN.

Figure 9:
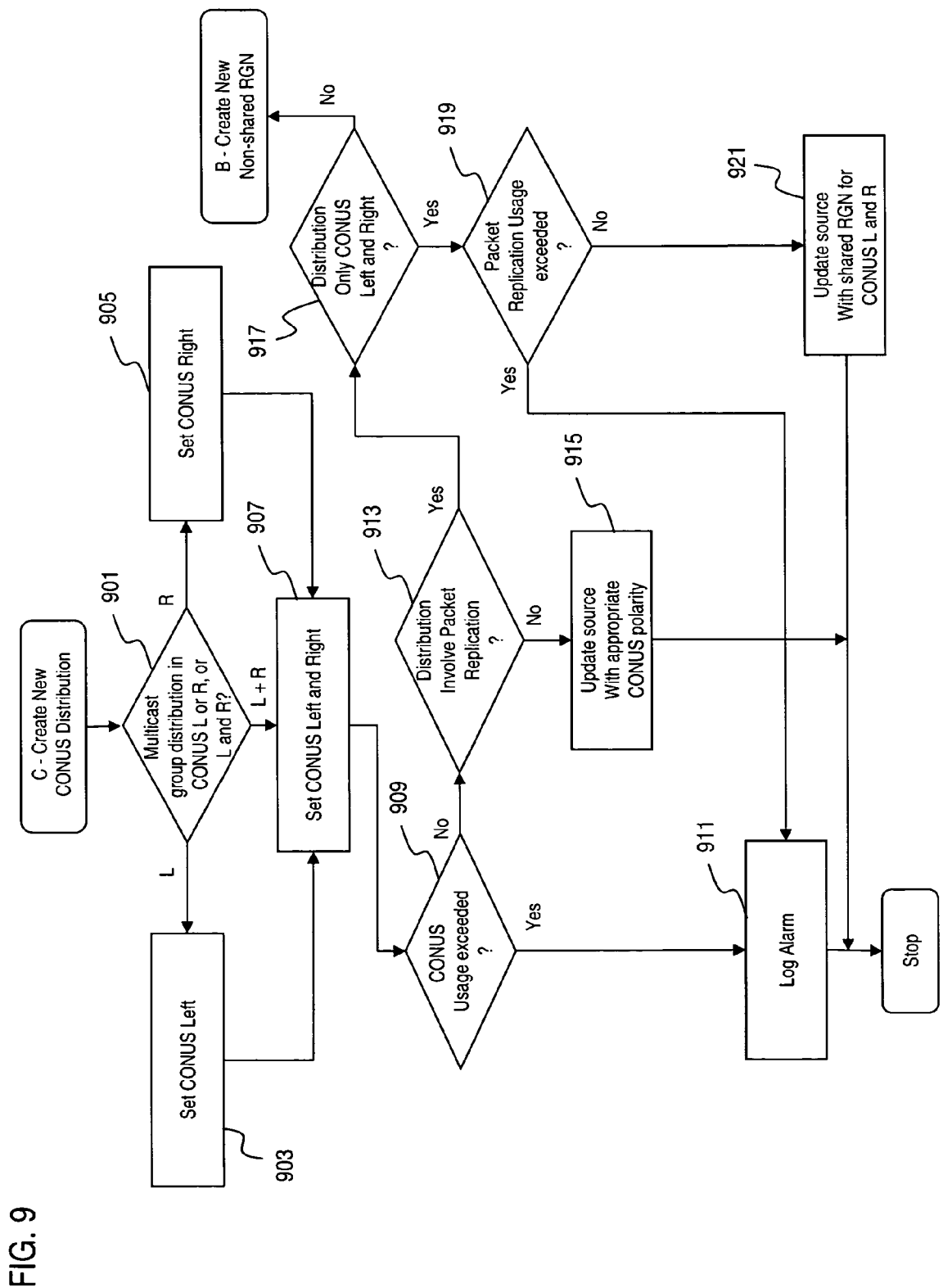
FIG. 9 is a flowchart of a process for creating a CONUS (Continental United States) distribution, in accordance with an embodiment of the present invention.

FIG. 9 is a flowchart of a process for creating a CONUS (Continental United States) distribution, in accordance with an embodiment of the present invention. To create a new CONUS distribution, the process, per step 901, determines the type of polarity: Left, Right, or both Left and Right. The process sets the polarity accordingly, per steps 903-907. In step 909, the process determines whether the CONUS Usage counter is exceeded; if exceeded, the process logs an alarm, as in step 911. If not exceed, the process checks whether the distribution, as in step 913, involves packet replication. If no packet replication is required, then the process updates the source ST 103 about the selected CONUS polarity (step 915).

In step 917, the process checks whether the CONUS polarity is both Left and Right; if not, the process creates a new non-shard RGN according to Sub-process B. Otherwise, in step 919, the process determines whether the Packet Replication Usage counter is exceeded. If the usage is exceeded, an alarm is logged, per step 911. However, if the usage has not been exceeded, then the source ST 103 is updated with the shared RGN for CONUS Left and Right, per step 921.

It is noted that the polarity on which an ST receives CONUS is not necessarily the same as the polarity on which the ST receives point-to-point. There is no correlation between the two polarities. It is expected that most multicast groups are configured such that the STs within that group all receive on the same CONUS polarity. This removes the need to use packet replication to reach a multicast group within CONUS that spans more than, for example, 40 microcells. However, there may be cases, especially in a highly utilized system, where the multicast group has receivers that listen to both CONUS polarities. In these cases, the multicast group is configured to be CONUS Left plus CONUS Right and, once the decision is made to go to CONUS, the multicast is sent on both polarities regardless of which STs have joined. Capacity can be further optimized, whereby all STs are to report their CONUS polarity in dynamic joins and make the CONUS polarity decision based on which STs have joined.

Figure 10:
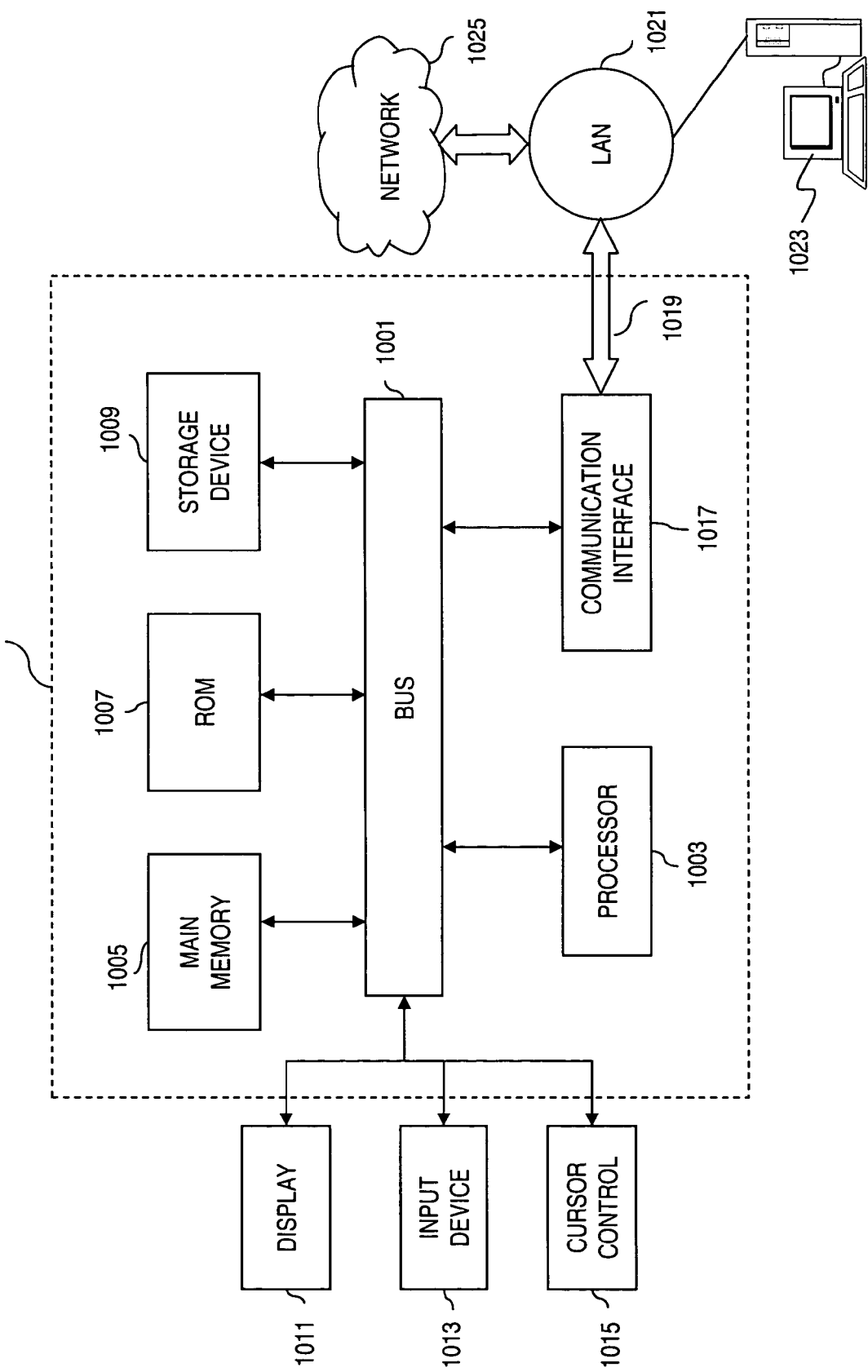
FIG. 10 is a diagram of a computer system that is capable of supporting multicasting, according to an embodiment of the present invention.

FIG. 10 is a diagram of a computer system that is capable of supporting multicasting, according to an embodiment of the present invention. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to one embodiment of the invention, the multicast distribution algorithm of FIGS. 6-9 is implemented by the computer system 1000 in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the present invention. Thus, embodiments of the present invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the present invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, an approach is provided for adapting terrestrial multicast services over a satellite network that includes a processing satellite capable of replicating packets. In response to a request for establishment of a multicast session, a hub station maps an Internet Protocol (IP) multicast address to a satellite address (e.g., Replication Group Number (RGN)) that is unique within the satellite network. The NOCC 109 transmits messages to participating satellite terminals 103, 105, 107 to configure them to support the multicast session. Further, the NOCC 109, according to an embodiment of the present invention, determines an appropriate multicast distribution mechanism to deliver the dataflow to the participating satellite terminals 103, 105, 107 (and ultimately the attached hosts in the multicast group). The distribution mechanisms utilize individually or in combination one or more spot beams and a broadcast type beam (e.g., Continental United States (CONUS)) based on, in an exemplary embodiment, capacity of the satellite network and reachability of the participating satellite terminals 103, 105, 107. The above approach advantageously provides a capability to support multicast services transparently over a satellite network. Another advantage is that satellite network resources are efficiently utilized in support of the multicast services, in that multiple distribution mechanisms are available to ensure sufficient coverage of the participating satellite terminals 103, 105, 107 while minimizing capacity waste.

While the present invention has been described in connection with a number of embodiments and implementations, the present invention is not so limited but covers various obvious modifications and equivalent arrangements, which fall within the purview of the appended claims.

What is claimed is:

1. A method for adapting multicast services over a satellite network, the method comprising:

receiving a request for establishing a multicast session associated with a network address conforming to a first communication protocol;

assigning an address conforming to a second communication protocol for a multicast group of satellite terminals within the satellite network to map to the network address;

transmitting configuration information including the assigned satellite address to the satellite terminals for establishment of the multicast session; and selecting one of a plurality of distribution mechanisms for transport of dataflow over the satellite network to the assigned satellite address, wherein the selected distribution mechanism is switched to another one of the distribution mechanisms based on capacity of the satellite network and reachability of the participating satellite terminals.

2. A method according to claim 1, further comprising:
generating a multicast distribution tree associated with the multicast group; and
updating the multicast distribution tree according to membership of the multicast group.

3. A method according to claim 1, wherein the first communication protocol in the receiving step is at a higher layer than the second communication protocol.

4. A method according to claim 1, further comprising:
establishing the multicast session according to one of an on-demand basis and a predetermined schedule.

5. A method according to claim 1, wherein the schedule in the establishing step is specified in the request by a network service provider.

6. A method according to claim 1, wherein the configuration information in the transmitting step further includes a transmission rate of the multicast session and type of multicast session.

7. A method according to claim 1, wherein the distribution schemes in the selecting step specify use of a one or more spot beams, a broadcast beam, or a combination thereof.

8. A computer-readable medium bearing instructions for adapting multicast services over a satellite network, the instructions being arranged, upon execution, to cause one or more processors to perform the steps of the method according to claim 1.

9. A method for adapting multicast services originated by a terrestrial network over a satellite network, the method comprising:
detecting a dataflow supporting a multicast from a source host within the terrestrial network;
transmitting a request for establishing a multicast session over the satellite network to a hub station, the request specifying a multicast network address supported by the terrestrial network, wherein the hub station selectively assigns a satellite address that maps to the multicast network address and configures a satellite within the satellite network with a multicast distribution plan of participating satellite terminals; and
receiving an acknowledgement message from the hub station specifying the satellite address, wherein the dataflow is forwarded by the source host over the satellite network to the participating satellite terminals according to the satellite address, wherein transport of the dataflow over the satellite network is according to one of a plurality of distribution schemes, the one distribution scheme being switched to another one of the distribution schemes based on capacity of the satellite network and reachability of the participating satellite terminals.

10. A method according to claim 9, wherein the satellite address in the transmitting step is associated with a lower protocol layer than the multicast network address.

11. A method according to claim 10, wherein the lower protocol layer is a Data Link Layer, and the multicast network address is an Internet Protocol (IP) address.

12. A method according to claim 9, wherein the multicast session is supported over the satellite network according to a distribution scheme that includes use of one of a spot beam and a broadcast beam.

13. A computer-readable medium bearing instructions for adapting multicast services originated by a terrestrial network over a satellite network, the instructions being arranged, upon execution, to cause one or more processors to perform the steps of the method according to claim 9.

14. A method for providing a multicast session over a satellite network, the method comprising:
identifying participating satellite terminals in the multicast session;
determining whether one or more spot beams can cover the participating satellite terminals;
selecting one of a plurality of distribution schemes based on the determining step; and
selectively switching to another distribution scheme that utilizes a broadcast beam according to predetermined criteria including capacity of the satellite network and reachability of the participating terminals.

15. A method according to claim 14, wherein the predetermined criteria include a threshold value for a number of downlink addresses for triggering switching to the other distribution scheme, the method further comprising:
setting the threshold value based on one of system resources of the satellite network and cost.

16. A method according to claim 14, further comprising:
determining whether packet replication is available for the multicast session for replicating packets over the one or more spot beams, the multicast session being assigned one of a plurality of replication group numbers for supporting multiple multicast sessions.

17. A method according to claim 14, wherein the satellite terminals in the identifying step are Very Small Aperture Terminal (VSAT) terminals.

18. A computer-readable medium bearing instructions for providing a multicast session over a satellite network, the instructions being arranged, upon execution, to cause one or more processors to perform the steps of the method according to claim 14.

19. A system for adapting multicast services over a satellite network, the system comprising:
means for receiving a request for establishing a multicast session associated with a network address conforming to a first communication protocol;
means for assigning an address conforming to a second communication protocol for a multicast group of satellite terminals within the satellite network to map to the network address;
means for transmitting configuration information including the assigned satellite address to the satellite terminals for establishment of the multicast session; and
means for selecting one of a plurality of distribution schemes for transport of dataflow over the satellite network to the assigned satellite address, wherein the selected distribution schemes is switched to another one of the distribution schemes based on capacity of the satellite network and reachability of the participating satellite terminals.

20. A system for providing a multicast session over a satellite network, the system comprising:
means for identifying participating satellite terminals in the multicast session;
means for determining whether one or more spot beams can cover the participating satellite terminals;
means for selecting one of a plurality of distribution schemes based on the determination; and
means for selectively switching to another distribution scheme that utilizes a broadcast beam according to a plurality of criteria including capacity of the satellite network and reachability of the participating terminals.

21. A method for adapting multicast services originating from a terrestrial network over a satellite network, the method comprising:

receiving a request for establishing a multicast session corresponding to a network address of the terrestrial network, the request specifying participating satellite terminals in the multicast session;

assigning an address unique within the satellite network to map to the network address for the multicast session;

configuring the participating satellite terminals with the assigned satellite address; and selecting one of a plurality of distribution mechanisms to transport dataflow of the multicast session to the participating satellite terminals, the distribution mechanisms utilizing one or more spot beams covering the participating satellite terminals, wherein the selected distribution mechanism is switched to another one of the distribution mechanisms based on capacity of the satellite network and reachability of the participating satellite terminals.

* * * * *